United States Patent
Nagasawa et al.

[11] Patent Number: 5,991,859
[45] Date of Patent: Nov. 23, 1999

[54] SEMICONDUCTOR STORAGE DEVICE HAVING ON-THE-FLY ADAPTABLE STORAGE CAPACITY

[75] Inventors: Yumiko Nagasawa, Tokyo; Shigeyuki Maeda, Kawasaki, both of Japan

[73] Assignee: Fujitsu Limited, Kawasaki, Japan

[21] Appl. No.: 08/937,215

[22] Filed: Sep. 17, 1997

Related U.S. Application Data

[63] Continuation of application No. 08/430,850, Apr. 28, 1995, abandoned.

[30] Foreign Application Priority Data

Jun. 23, 1994 [JP] Japan .................................. 6/142033

[51] Int. Cl.$^6$ ........................................................ G06F 9/38
[52] U.S. Cl. ...................... 711/170; 711/154; 711/171; 711/172; 711/162
[58] Field of Search .................................. 711/170, 171, 711/172, 173, 5, 162, 154; 707/206, 205; 395/182.04, 876; 714/6; 710/56

[56] References Cited

U.S. PATENT DOCUMENTS

| | | | |
|---|---|---|---|
| 4,771,375 | 9/1988 | Beglin et al. | 711/111 |
| 4,775,932 | 10/1988 | Oxley et al. | 707/206 |
| 5,088,036 | 2/1992 | Ellis et al. | 707/206 |
| 5,109,336 | 4/1992 | Guenther et al. | 711/171 |
| 5,121,495 | 6/1992 | Nemes | 707/3 |
| 5,193,168 | 3/1993 | Corrigan et al. | 707/100 |
| 5,218,698 | 6/1993 | Mandl | 711/165 |
| 5,274,804 | 12/1993 | Jackson et al. | 707/206 |
| 5,339,411 | 8/1994 | Heaton, Jr. | 711/171 |
| 5,355,483 | 10/1994 | Serlet | 711/154 |
| 5,398,142 | 3/1995 | Davy | 360/48 |
| 5,432,922 | 7/1995 | Polyzois et al. | 395/182.04 |
| 5,530,850 | 6/1996 | Ford et al. | 707/206 |
| 5,551,003 | 8/1996 | Mattson et al. | 711/136 |
| 5,560,003 | 9/1996 | Nilsen et al. | 707/206 |
| 5,687,368 | 11/1997 | Nilsen | 711/103 |

FOREIGN PATENT DOCUMENTS

| | | |
|---|---|---|
| 61-112254 | 5/1986 | Japan . |
| 62-154018 | 7/1987 | Japan . |
| 4217017 | 8/1992 | Japan . |

*Primary Examiner*—Eddie P. Chan
*Assistant Examiner*—Hong Kim
*Attorney, Agent, or Firm*—Greer, Burns & Crain, Ltd.

[57] ABSTRACT

A semiconductor storage device has semiconductor memories each divided into a plurality of logical volumes, wherein host units connected to the semiconductor storage device perform read/write accesses to the logical volumes via access means, the semiconductor storage device further including: data shifting means which performs data shifting required when the constitution of the logical volume is modified, by using a memory block table provided for data shifting process and data shifting buffers provided in a stand-by memory, the data shifting being done in units of memory blocks within the logical volume which is subject to modification; and access control means for managing an access instruction table provided for access from the host units to the target addresses, and for allowing accesses from the host units to be performed properly while the data is being shifted.

43 Claims, 20 Drawing Sheets

| DRIVE | STARTING ADDRESS | CAPACITY |
|---|---|---|
| 0 | 0 0 0 0 0 0 0 0 | 1 1 2 0 0 |
| 1 | 0 0 0 1 1 2 0 0 | 2 6 0 0 0 |

FIG. 7

| DRIVE | 0 | 1 | 2 |
|---|---|---|---|
| YES/NO | YES | YES | YES |
| FORKING | NO | YES | NO |
| NUMBER OF CYLINDERS | 100 | 100 | 100 |
| BLOCK 1 STARTING ADDRESS | 00000000 | 00010000 | 00015000 |
| NUMBER OF CYLINDERS IN BLOCK1 | 100 | 50 | 50 |
| BLOCK 2 STARTING ADDRESS | | 00020000 | 00025000 |
| NUMBER OF CYLINDERS IN BLOCK2 | | 50 | 50 |
| BLOCK N STARTING ADDRESS | | | |
| NUMBER OF CYLINDERS IN BLOCK N | | | |
| FORKING STARTING ADDRESS (SOURCE ADDRESS READ) | | 00020000 | |
| FORKING STARTING ADDRESS (ADDRESS NOT READ) | | 08000000 | |
| NUMBER OF CYLINDERS PROCESSED | | 50 | |

F I G. 9

| BLOCK | STARTING ADDRESS | CAPACITY | VALID DATA | DESTINATION ADDRESS |
|---|---|---|---|---|
| 0 | 00000000 | 11200 | YES | 00000000 |
| 1 | 00011200 | 26000 | YES | 00031200 |
| 2 | 00033200 | 20000 | NO | — |
| 3 | 00053200 | 10000 | NO | — |

SEMICONDUCTOR STORAGE DEVICE HAVING ON-THE-FLY ADAPTABLE STORAGE CAPACITY

This application is a continuation of application Ser. No. 08/430,850 filed on Apr. 28, 1995, now abandoned.

BACKGROUND OF THE INVENTION

1. Field of the Invention

The present invention relates to semiconductor storage devices, and more particularly to a semiconductor storage device which, connected to a host computer, is operated such that a semiconductor memory is divided into a plurality of logical volumes.

One of the requirements for a semiconductor storage device is that the constitution of a logical volume can be modified without stopping the operation.

2. Description of the Prior Art

In a conventional semiconductor storage device operated such that a semiconductor memory is divided into a plurality of logical volumes, the operation of the semiconductor storage device must be stopped and data in the semiconductor memory is saved in a magnetic tape device or the like, before the constitution of the logical volume is modified. Thereafter, the data saved in the magnetic tape device or the like is restored in the semiconductor memory.

A problem with the conventional semiconductor storage device is that an exhaustive operation for modifying the constitution of the logical volumes is necessary when the existing logical volume is to be expanded by newly installing a semiconductor memory, and that each time the modifying operation is carried out, the operation of the semiconductor storage device has to be stopped, and data has to be saved. Another aspect of the problem is that the host computer has to be stopped when the data is to be saved, because the host computer is used in the saving operation.

One approach to solve the problem is that the expanded (newly installed) memory is used as an expanded logical volume, and the expanded logical volume is linked to the existing logical volumes. However, there is a limit to the number of links of logical volumes established. Hence, it is necessary to modify the entirety of the constitution of the logical volumes before the limit for the number of links is reached. Each time the modifying operation is carried out, the operation of the semiconductor storage device must be stopped, and data saving operation must be carried out.

SUMMARY OF THE INVENTION

Accordingly, it is a general object of the present invention to provide a semiconductor storage device (memory device) in which the aforementioned problem is eliminated.

Another and more specific object of the present invention is to provide a semiconductor storage device in which the constitution of the logical volume can be modified without having to stop the operation of the semiconductor storage device.

In order to achieve the above objects, the present invention provides a semiconductor storage device having semiconductor memories each divided into a plurality of logical volumes, wherein host units connected to the semiconductor storage device perform read/write accesses to the logical volumes via access means, the semiconductor storage device further comprising: data shifting means which performs data shifting required when the constitution of the logical volume is modified, the data shifting being done by using data shifting buffers provided in a stand-by memory, in units of memory blocks within the logical volume which is subject to modification; and access control means for allowing accesses from the host units to be performed properly while the data is being shifted. According to the semiconductor storage device of the present invention, the data shifting means shifts data in the semiconductor memory in correspondence to a modification of the constitution of the logical volume, without stopping access from the host unit, and the access control means allows access from the host units to be performed properly while the data is being shifted. In this way, it is possible modify the constitution of the logical volume without prohibiting access from the host unit.

In another aspect of the present invention, each of the semiconductor memories are divided into a plurality of groups, and the access means has a function of writing the same data to each of the plurality of groups at the same time. According to this aspect of the present invention, it is possible for the host unit to write data to a data source and to a data destination at the same and to reduce time required for shifting data.

In still another aspect of the present invention, the data shifting means creates, when data shifting process is started, a memory block table in a work memory, the memory block table including the information relating to a starting address of each memory block, a capacity of each memory block, presence or absence of valid data in each memory block, and a starting address of a destination memory block, and the data shifting means refers to/modifies the memory block table during the data shifting process. According to this aspect of the present invention, it is possible to perform data shifting easily by using a memory block table.

In yet another aspect of the present invention, the data shifting means creates, when data shifting process is started, a memory block table in a work memory, the memory block table including the information relating to a starting address of each memory block, a capacity of each memory block, presence or absence of valid data in each memory block, and a starting address of a destination memory block, and the data shifting means refers to/modifies the memory block table during the data shifting process. According to this aspect of the present invention, access from the host unit can be performed properly and easily using the access instruction table.

BRIEF DESCRIPTION OF THE DRAWINGS

Other objects and further features of the present invention will be apparent from the following detailed description when read in conjunction with the accompanying drawings, in which:

FIG. 7 illustrates an example of an access instruction table;

FIG. 9 illustrates an example of a memory block table;

DESCRIPTION OF THE PREFERRED EMBODIMENTS

Figure 1:
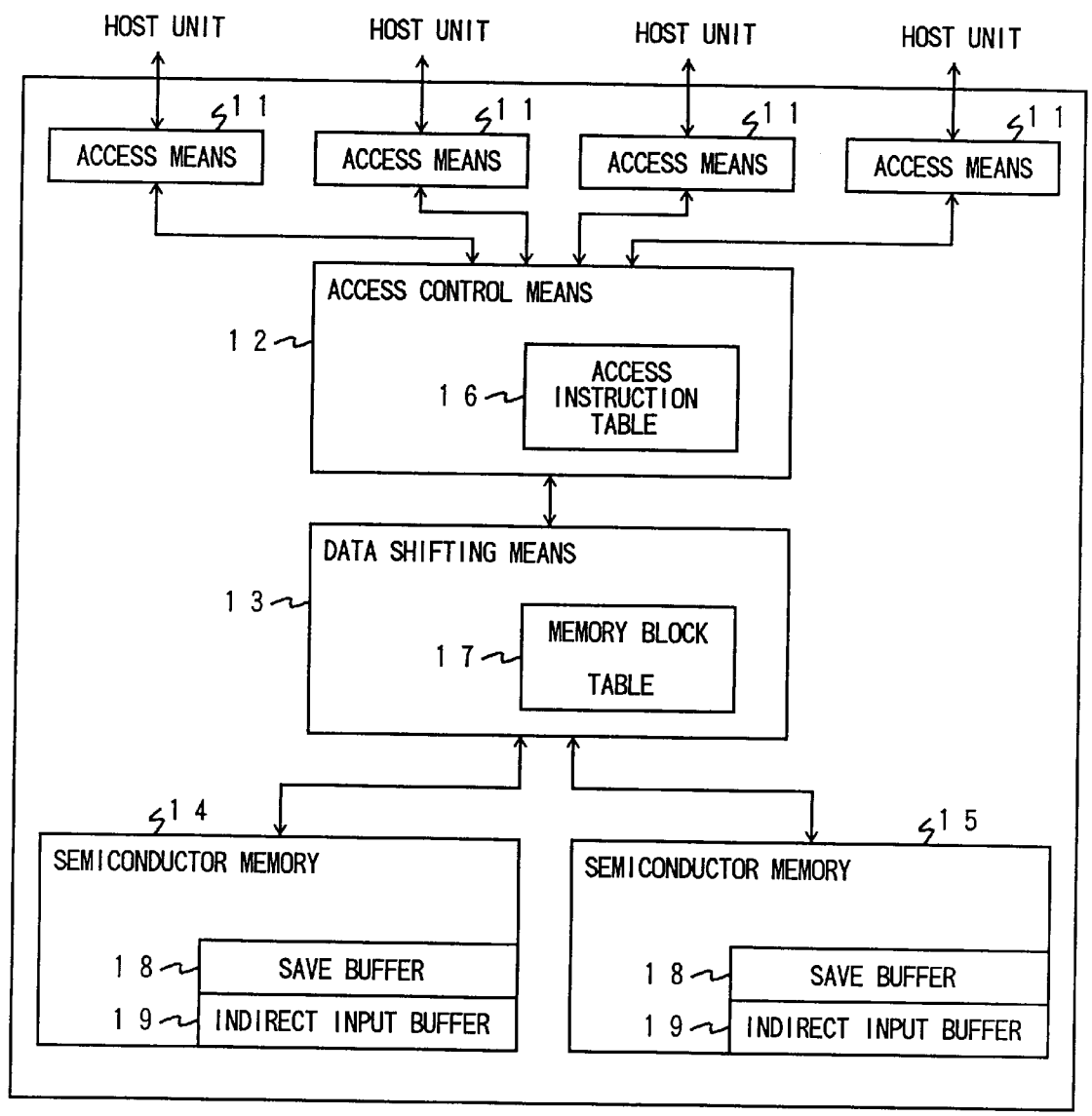
FIG. 1 illustrates the principle of the present invention.

FIG. 1 illustrates the principle of the present invention. A semiconductor storage device (memory device) shown in FIG. 1 has semiconductor memories 14 and 15, each of the memories 14 and 15 being divided into a plurality of logical volumes. Each of host units connected to the semiconductor storage device accesses a logical volume via access means 11 in reading and writing operations. When the constitution of the logical volume is to be modified, a data shifting means 13 shifts data as required using a memory block table 17 provided for the purpose of shifting data and using save buffer means 18 and indirect input buffer 19, the shifting being conducted in units of memory blocks in the logical volume. An access control means 12 manages an access instruction table 16 provided for access to target addresses from the host units, so that accesses from the host units can be performed properly.

Figure 2:
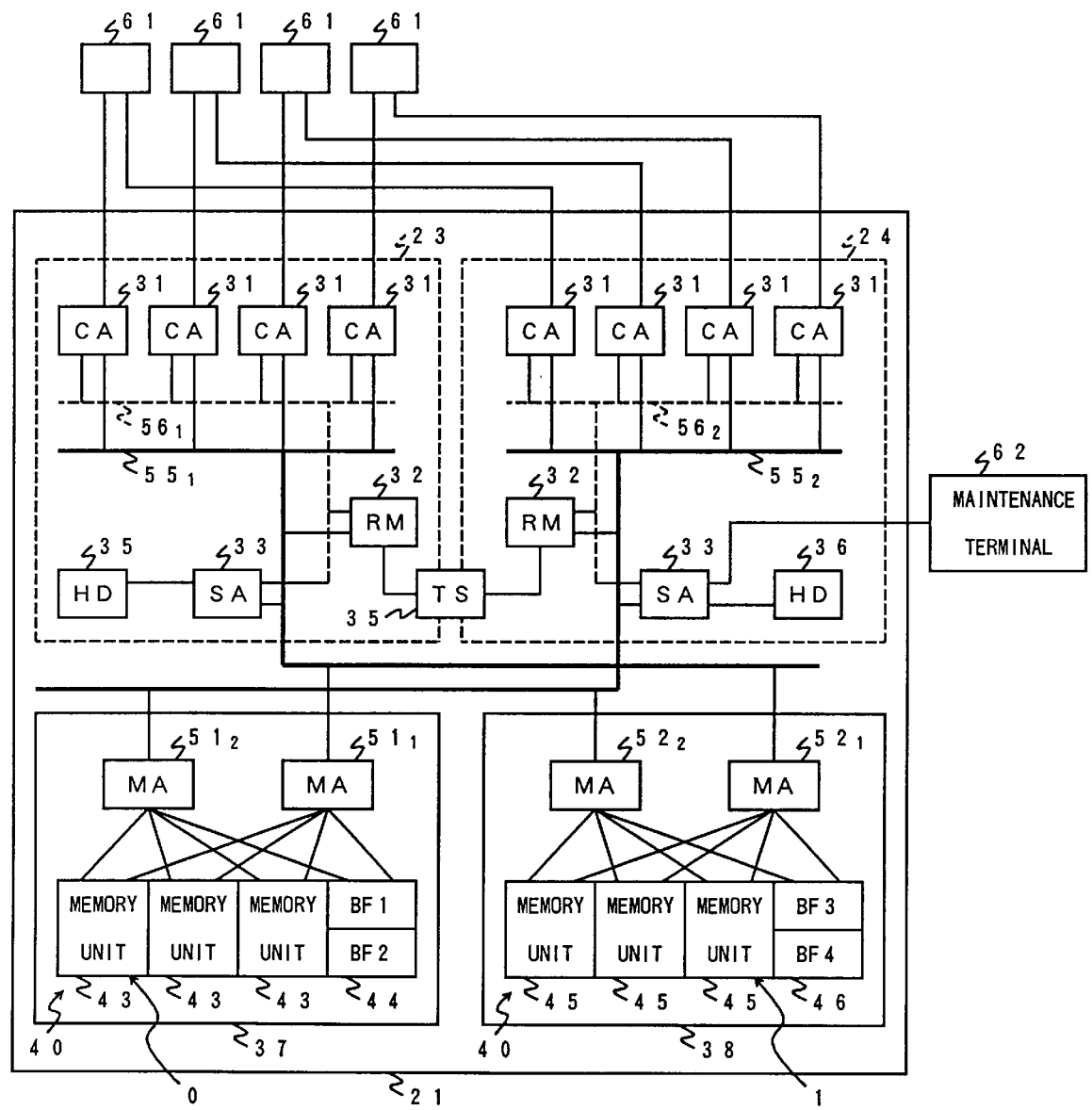
FIG. 2 illustrates a construction of a semiconductor disk device according to an embodiment of the present invention.

FIG. 2 illustrates a construction of a semiconductor disk device (semiconductor storage device) 21 according to an embodiment of the present invention. The semiconductor disk device 21 is a device emulating a magnetic disk device and uses semiconductor memory 40 as a recording medium. The device 21 is characterized by an extremely quick response to host computers 61 because it operates the semiconductor memory 40 in accordance with commands issued by the host computer 61 to the semiconductor disk device 21.

The semiconductor disk device 21 comprises: two control units 23 and 24; the semiconductor memory 40 comprising a memory bank 0 and a memory bank 1; and memory control units (MA) $51_1$, $51_2$, $52_1$ and $52_2$.

Channel interface controllers (CA:Channel Adaptor) 31, an exclusive controller (RM:Resource Manager) 32 and a maintenance controller (SA: Service Adaptor) 33 of the control unit 23 are connected to each other via a data bus $55_1$ and a control bus $56_1$. Likewise, the interface controllers (CA) 31, the exclusive controller (RM) 32 and the maintenance controller (SA) 33 of the control unit 24 are connected to each other via a data bus $55_2$ and a control bus $56_2$. The exclusive controllers (RM) 32 of the control units 23 and 24 are connected to a shared exclusive control memory (TS:Table Storage) 35. Each of the maintenance controllers (SA) 33 is connected to a respective hard disk drive (HD) 36 for storage of microcodes.

A bank unit 37 includes the memory bank 0 and two memory control units (MA) $51_1$ and $51_2$ connected to all the addresses of the memory bank 0, and a bank unit 38 includes the bank 1 and two memory control units (MA) $52_1$ and $52_2$ connected to all the addresses of the memory bank 1.

The data bus $55_1$ connected to the control unit 23 is connected to the memory control unit $51_1$ (MA) for controlling the memory bank 0 and the memory control unit $52_1$ (MA) for controlling the memory bank 1. The data bus $55_2$ connected to the control unit 24 is connected to the memory control unit $51_2$ for controlling the memory bank 0 and the memory control unit $52_2$ for controlling the memory bank 1.

Each of the interface controllers 31 (CA) of the control units 23 and 24 is connected to a channel of the respective host computer 61 and has a channel interface function. Each of the interface controllers 31 (CA) receives a read/write command issued by the corresponding host computer 61 to the semiconductor disk device 21, translates the command into a form capable of accessing the semiconductor memory 40 (hereinafter, simply referred to as memory), executes the translated command, and returns a response to the host computer 61.

The exclusive controllers 32 (RM) perform exclusive control on the memory 40 in units of cylinders so that no inconvenience is encountered when a plurality of interface controllers 31 (CA) and maintenance controllers (SA) 33 (described later) perform read/write operations on the memory 40 without consulting other interface controllers 31 (CA) and maintenance controllers (SA) 33. The exclusive controllers 32 also performs serialization and the like of inner commands issued by the interface controllers (CA) 31 and the maintenance controllers (SA) 33.

The shared exclusive control memory 35 (TS) is a memory used by the exclusive controllers 32 (RM) for exclusive control. The semiconductor disk device 21 includes the two control units 23 and 24 having the same function, and the interface controllers 31 (CA) and the maintenance controllers (SA) 33 of the control units 23 and 24 access the shared memory 40. Therefore, the shared exclusive control memory 35 (TS) may be accessed by the exclusive controllers 32 (RM) of both the control units 23 and 24. Hence, it is possible for the exclusive controllers 32

(RM) to perform a read/write operation on the shared exclusive control memory 35 (TS), while the interface controllers 31 (CA) and the maintenance controllers 35 (TS) are only able to read the shared exclusive control memory 35 (TS).

Each of the maintenance controllers 33 (SA) performs operations relating to maintenance, the operations including start-up of the interface controllers 31 (CA) and the exclusive controllers 32 (RM), notification to the interface controllers 31 (CA) and the exclusive controllers 32 (CA) of a power disconnection and logical drive allocation. The maintenance controller 35 (SA) supports the interface of a maintenance terminal 62 as maintenance input/output equipment.

Each of the memory control units $51_1$ and $51_2$ (MA) executes a read/write command delivered via the data buses $55_1$ and $55_2$ connected thereto, all the addresses of the memory bank 0 being made accessible. Likewise, each of the memory control units $52_1$ and $52_2$ (MA) executes a read/write command delivered via the data buses $55_1$ and $55_2$ connected thereto, all the addresses of the memory bank 1 being made accessible.

The memory bank 0 comprises a plurality of memory units 43 and a stand-by memory unit 44. Each of the memory units 43 and 44 is formed of, for example, a printed board. Likewise, the memory bank 1 comprises a plurality of memory units 45 and a stand-by memory unit 46.

The stand-by memory unit 44 is provided with a buffer BF1 and a buffer BF2. The stand-by memory unit 46 is provided with a buffer BF3 and a buffer BF4.

Figure 3:
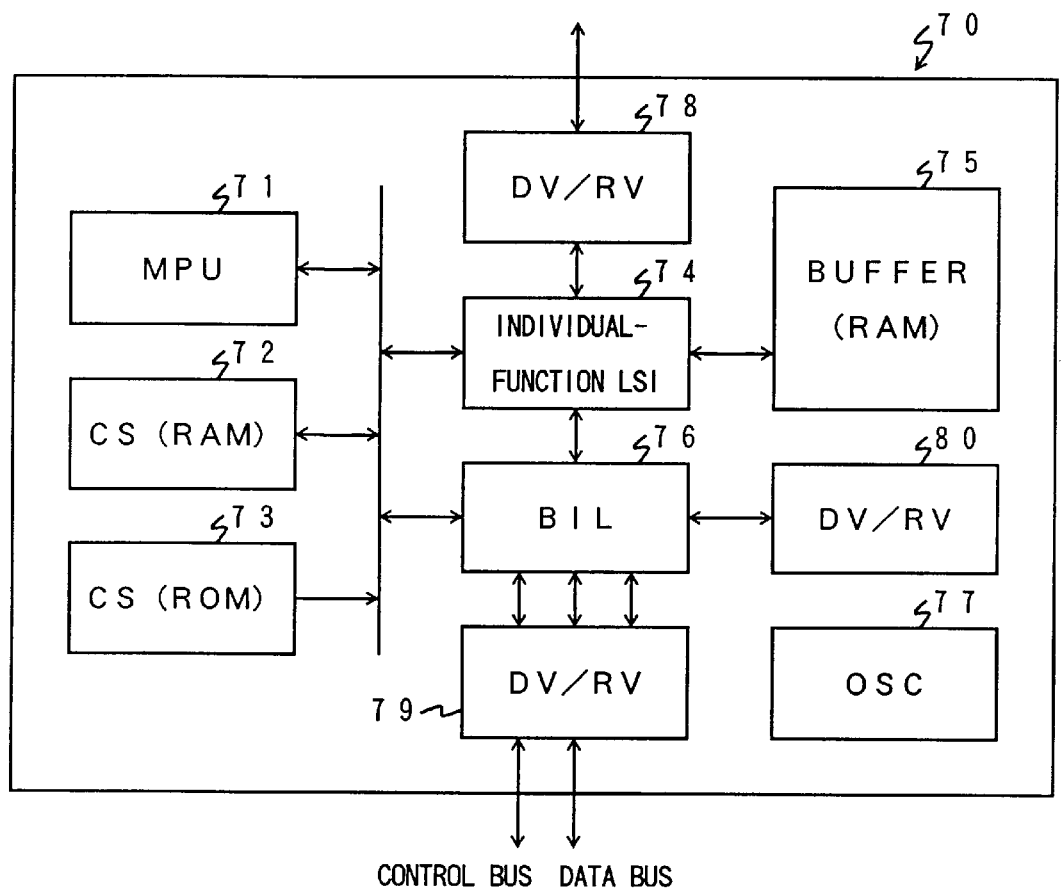
FIG. 3 illustrates a construction of a module constituting an interface controller, an exclusive controller and a maintenance controller.

A description will now be given of a construction of a module constituting the interface controllers 31 (CA), the exclusive controllers 32 (RM) and the maintenance controllers 33 (SA). FIG. 3 illustrates a construction of a module constituting the interface controllers 31 (CA), the exclusive controllers 32 (RM) and the maintenance controllers 33 (SA). In the semiconductor disk device 21 of the embodiment, the interface controllers 31 (CA), the exclusive controllers 32 (RM) and the maintenance controllers 33 (SA) are formed using the same module as shown in FIG. 3.

A module 70 comprises: a microprocessor (MPU) 71 for controlling the entirety of the module; a control storage 73 (CS) comprised of a ROM which stores firmware for controlling the module; and a control storage 72 (CS) comprised of a RAM which is used in various operations, the microprocessor (MPU) 71, the control storage 73 (CS) and the control storage 72 (CS) being connected to each other via a bus. The module 70 also is equipped with an individual-function LSI 74 constructed to adapt to the type of the module, a bus interface logic (BIL) 76, a buffer 75, drivers/receivers (DR/RV) 78–80 for interface, and a oscillator 77 (OSC).

The driver/receiver (DR/RV) 79 is connected to the control bus and the data bus within the semiconductor disk device 21. The driver/receiver (DR/RV) 80 is connected to a debugger.

The operation of the module 70 is controlled by the control of the microprocessor (MPU) 71 in accordance with the firmware specific to the type of the controller; i.e. the interface controller 31 (CA), the exclusive controller 32 (RM) or the maintenance controller 33 (SA).

A description will now be given of emulation of a logical drive in the semiconductor disk device of the embodiment. In the semiconductor disk device 21, it is required that all logical drives have a portion of the memory 40 allocated thereto in order to realize a device address (logical drive) on the memory 40, the device address being specified when the host computer 61 issues a command. A description will now be given of allocation of the memory 40 to the logical drives.

Figure 4:
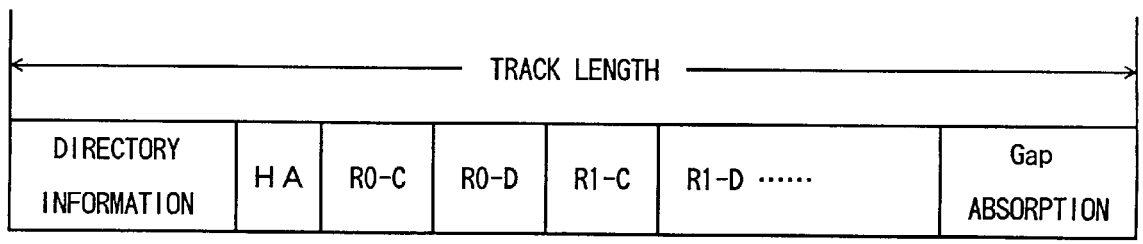
FIG. 4 is a diagram explaining a track format formed on a memory track by emulation.
Figures 5, 6:
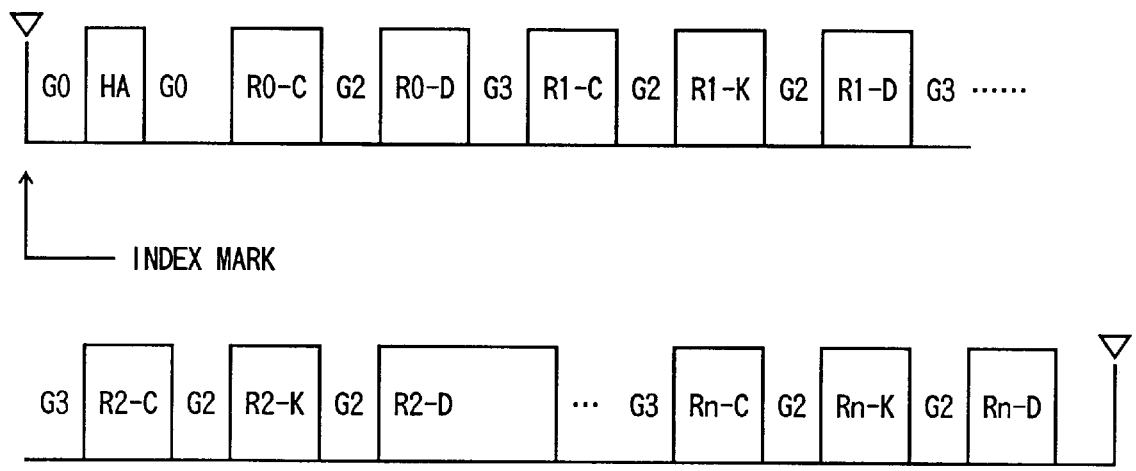
FIG. 5 is a schematic diagram of the CKD format.
FIG. 6 illustrates an example of a drive allocation table.

FIG. 4 is a diagram explaining a track format formed on the memory 40 of the semiconductor disk device 21 in order to emulate the CKD format of a magnetic disk. FIG. 5 is a schematic diagram of the CKD format of a magnetic disk.

In the CKD format, a home address part (HA), a count part (Ri-C) for each record, a key part (Ri-K) and a data part (Ri-D) are recorded, wherein i=0–n, gaps G0, G2 and G3 intervening.

A cylinder number and a track number are recorded in the home address part (HA). In the count part (Ri-C) for each record, a cylinder number, a head number, a data length of the data part (Ri-D), a length of the key part (Ri-K) and the like are recorded. In the key part (Ri-K), information indicating an attribute of data recorded in the data part (Ri-D) is recorded.

The track format formed in the memory 40 comprises a directory information part, a home address part (HA), a count part (Ri-C) for each record and a data part (Ri-D) and a gap absorption part for maintaining the data length of the track constant. In the directory information part, addresses for each record on the memory 40 are recorded.

FIG. 6 is a diagram illustrating an example of a drive allocation table provided in the semiconductor disk device 21. In the drive allocation table, a starting address and a capacity allocated in the memory 40 to each logical drive are recorded. The capacity is represented by the number of cylinders emulated. The drives are arranged in the memory 40 in the ascending order of the drive number. Normally, the consecutive addresses are allocated to the entirety of capacity used for each drive.

Normally, the drive allocation table created by the maintenance controller 33 (SA) is read by the exclusive controller 32 (RM) when the power is turned ON and is utilized to create the access instruction table described later. FIG. 7 illustrates an example of the access instruction table. In the access instruction table which is utilized when the host computer 61 accesses the memory 40, a capacity (the number of cylinders) for each drive, an address and capacity of blocks within a drive are recorded. The content of the access instruction table is transferred by the exclusive controllers 32 (RM) to the interface controllers 31 (CA).

When a signal for specifying accessed areas arrives from the host computer 61, the interface controller 31 (CA) refers to the access instruction table in accordance with the address (the logical drive number, the cylinder number, the head number) specified by the host computer 61. Thereupon, the interface controller 31 (CA) determines an address (cylinder address) of the track addressed, and then confirms a memory address of the target record on the basis of the directory information of the track so that the target record is searched for.

A description will now be given of a forking write operation executed in the semiconductor disk device 21. A forking write operation is an operation whereby the same data is written to a plurality of addresses in a memory substantially simultaneously, using an en block data transfer. The exclusive controller 32 (RM), the interface controller 31 (CA) and the maintenance controller 33 (SA) are able to perform a forking write operation on two addresses, one being located in the memory bank 0 of the memory 40 and the other being located in the memory bank 1 of the memory 40. The forking write operation is carried out according to the following scheme.

The format of a write command issued to the memory control units $51_1$, $52_1$, $51_2$ and $52_2$ is arranged such that a write command, a write address and write data are transferred in packets in the stated order.

The exclusive controller 32 (RM), the interface controller 31 (CA) and the maintenance controller 33 (SA) of the control unit 23 specify, as a receiving module, the memory control unit $51_1$ (MA) for controlling the memory bank 0, and issue a write command to the receiving module. The exclusive controller 32 (RM), the interface controller 31 (CA) and the maintenance controller 33 (SA) of the control unit 23 also specify, as a receiving module, the memory control unit $52_1$ for controlling the memory bank 1, and issue a write command to the receiving module. The memory control units $51_1$ and $52_1$ are connected to each other via the data bus $55_1$. Thereafter, the exclusive controller 32 (RM), the interface controller 31 (CA) and the maintenance controller 33 (SA) of the control unit 23 transfer a write address to the memory control units $51_1$ and $52_1$, and then transfer all write data thereto. Upon receiving the write data, the memory control units $51_1$ and $52_1$ successively writes the received data, using the specified address in the memory bank 0 and the memory bank 1.

Similarly to the exclusive controller 32 (RM), the interface controller 31 (CA) and the maintenance controller 33 (SA) of the control unit 23, the exclusive controller 32 (RM), the interface controller 31 (CA) and the maintenance controller 33 (SA) of the control unit 24 specify, as a receiving module, the memory control unit $51_2$ (MA) for controlling the memory bank 0, and also specify, as a receiving module, the memory control unit $52_2$ for controlling the memory bank 1, the memory control units $51_2$ and $52_2$ being connected to each other via the data bus $55_2$. The exclusive controller 32 (RM), the interface controller 31 (CA) and the maintenance controller 33 (SA) of the control unit 24 perform a forking write operation by transferring a write command, a write address and write data to the specified receiving module.

A description will now be given of the operation of modifying the constitution of the logical drives in the semiconductor disk device 21, for expansion of the logical drives or setting of new drives.

Figure 8:
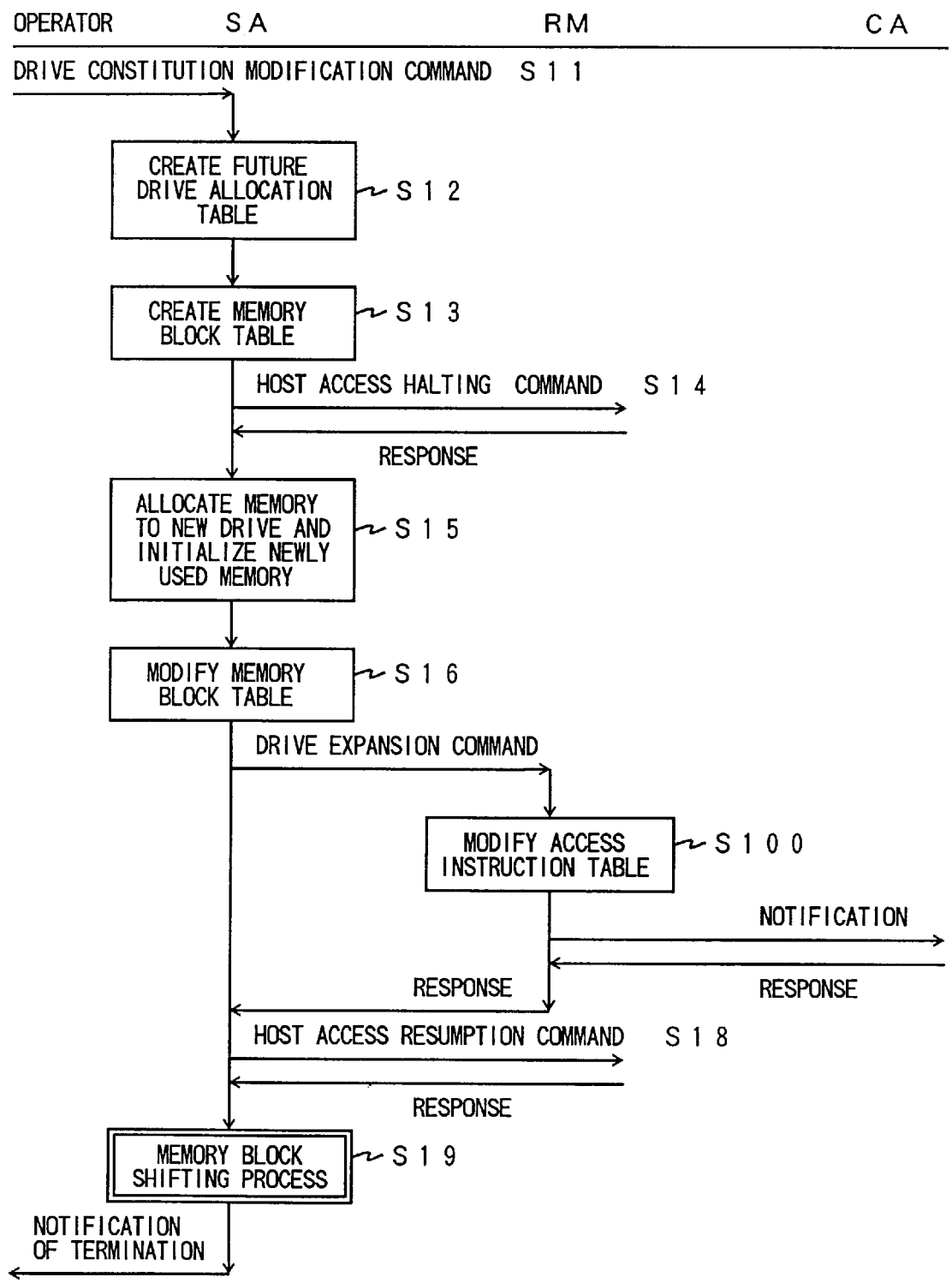
FIG. 8 is a flowchart illustrating a procedure followed when the logical drive constitution is modified.

FIG. 8 is a flowchart illustrating the procedure followed when the logical drive constitution is modified. The constitution of logical drives is modified as follows when a logical drive used in the semiconductor disk device 21 is expanded, or when the number of logical drives is increased.

In S11, an operator (maintenance personnel) inputs a logical drive constitution via the host computer 61 or the maintenance terminal 62 so as to issue a drive constitution modification command to the maintenance controller 33 (SA).

The drive constitution modification command includes the following information for all the logical drives.
  drive number
  drive type
  capacity
  instruction as to whether data is to be shifted from the
    drive under the current constitution or initialization is
    to be carried out In S12, the memory addresses renewed after modifying the drive constitution are determined so that the entirety of the capacity of each drive has the consecutive addresses allocated thereto, the determination operation proceeding in the ascending order of the drive number. In this way, the future drive allocation table is created.

In S13, the memory block table used in shifting memory blocks is created. FIG. 9 illustrates an example of the memory block table. In the embodiment, a memory block refers to a physically consecutive area in the memory 40 in which area successive data for one drive is written, or a physically consecutive area in which no valid data is written. The memory block table explains the current memory construction, and includes the following information about each memory block.
  starting address
  capacity
  presence or absence of valid data
  starting address of the destination (which is valid when
    there is valid data, and indicates the address in which
    data of a future memory block is disposed)

The maintenance controller 33 (SA) refers to the current drive allocation table and the access instruction table and registers the starting address and capacity of each memory block. Unused memory blocks resulting from a memory expansion is registered as a memory block where there is no valid data. Memory blocks corresponding to the drive specified by the drive constitution modification command to be initialized is also regarded as a memory block where there is no valid data.

As for memory blocks where there is valid data, the destination address is registered by referring to the future drive allocation table.

In S14, the maintenance controller 33 (SA) refers to the content of the drive constitution modification command, the current drive allocation table and the future drive allocation table, and issues a host access halting command to the exclusive controller 32 (RM) so that the host computer 61 cannot access the drive in which the capacity is modified and the drive which is initialized.

Upon receiving the host access halting command, the exclusive controller 32 (RM) issues, to the interface controllers 31 (CA) a command requesting for halting of access to the drive. When the interface controllers 31 (CA) acknowledge the command, the exclusive controller 32 (RM) notifies the maintenance controller 33 (SA) of termination of the command process.

In S15, the current memory block in which there is no valid data is allocated to an expansion of the existing drive and a newly installed drive, in the ascending order of the memory address, and in the ascending order of the drive number. A memory block table is modified for each expansion and new drive.

The maintenance controller 33 (SA) formats the memory so that the newly used areas (memory blocks) emulate the CKD format.

In S16, the maintenance controller 33 (SA) rewrites the memory block table to indicate that there is valid data in the formatted memory block. The destination address of the memory block of the memory block table is registered by referring to the number of cylinders of the corresponding drive registered in the future drive allocation table and the current drive allocation table.

In S17, the maintenance controller 33 (SA) notifies, using a drive expansion command, the exclusive controller 32 (RM) of the drive number, the starting address, the capacity of the drives, whose capacity is modified, and the new drives.

In S100, the exclusive controller 32 (RM) modifies the access instruction table in accordance with the above notification, and notifies all the interface controllers 31 (CA) of the modification of the access instruction table. When there is a response from all the interface controllers 31 (CA)

to the exclusive controller 32 (RM), the exclusive controller 32 (RM) notifies the maintenance controller 33 (SA) of the completion of the process.

In S18, the maintenance controller 33 notifies, using a host access resumption command, the exclusive controller 32 that the drives whose capacity is modified and the newly created drives are ready for access from the host computer 61. Also, the exclusive controller 32 (RM) notifies all the interface controllers 31 (CA) that the drives whose capacity is modified and the newly created drives are ready for access from the host computer 61.

The modification of the drive constitution is completed as far as the host computer 61 is concerned. The host computer 61 is now ready to perform read/write operations in a new drive constitution.

In S19, the memory block shifting process necessitated by the modification of the drive constitution is carried out. The maintenance controller 33 (SA) performs data shifting process for each memory block in the ascending order of the memory address. In this memory block shifting process, it is not necessary to stop access from the host computer 61, as described later.

Figure 10:
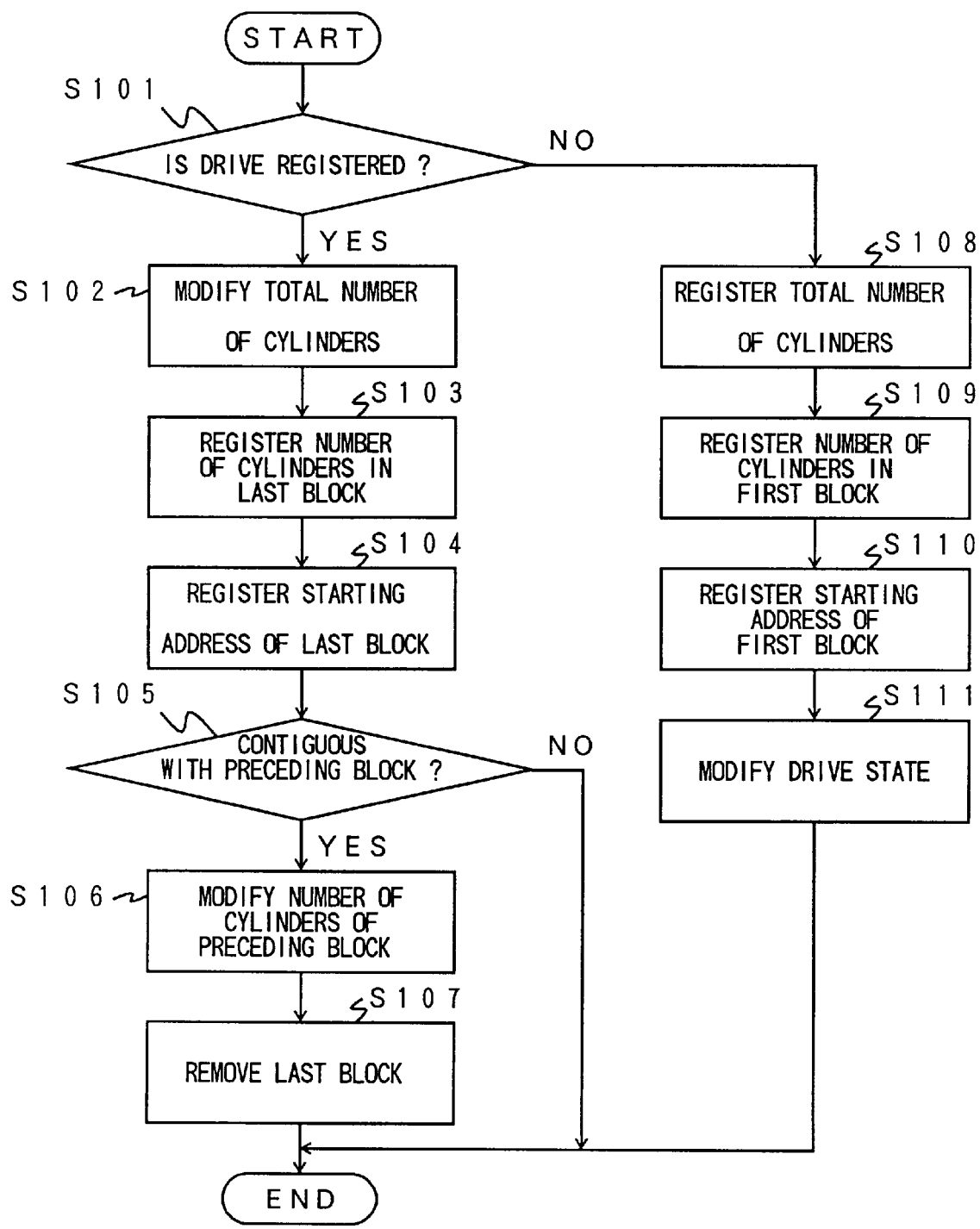
FIG. 10 is a flowchart illustrating a modification procedure of the access instruction table executed in correspondence to a drive expansion command.

FIG. 10 is a flowchart illustrating the modification procedure of the access instruction table executed in correspondence to a drive expansion command. In S101, the exclusive controller 32 (RM), upon receiving the drive expansion command from the maintenance controller 33 (SA), refers to the access instruction table so as to determine whether or not the drive has already been registered. When the drive has been registered, the exclusive controller 32 (RM) determines that cylinders are added in the drive. In S102, the exclusive controller 32 (RM) adds the additional number of cylinders to the total number of cylinders, and, in S103 and 104, registers, as information relating to a last block of the drive, the number of cylinders and the starting address delivered in a parameter.

In S105, the exclusive controller 32 (RM) determines whether or not the new block is physically contiguous with the last block of the drive before the command is processed. When the blocks are contiguous with each other, the exclusive controller 32 adds the additional number of cylinders to the number of cylinders of the last block in S106 and 107, cancels the registration of the new block, and then terminates the process.

When it is determined, in S101, that the drive did not exist before the command is processed, the drive is determined to be a new drive. In this case, in S108 and S109, the capacity specified in a parameter is registered as the total number of cylinders and the number of cylinders in the first block. In S110, the starting address specified in a parameter is registered as the starting address of the first block. Thereafter, in S111, the drive presence/absence information is made to designate presence (Yes) of the drive. When the modification of the access instruction table is completed, the exclusive controller 32 (RM) notifies the maintenance controller 33 of the completion.

Figure 11:
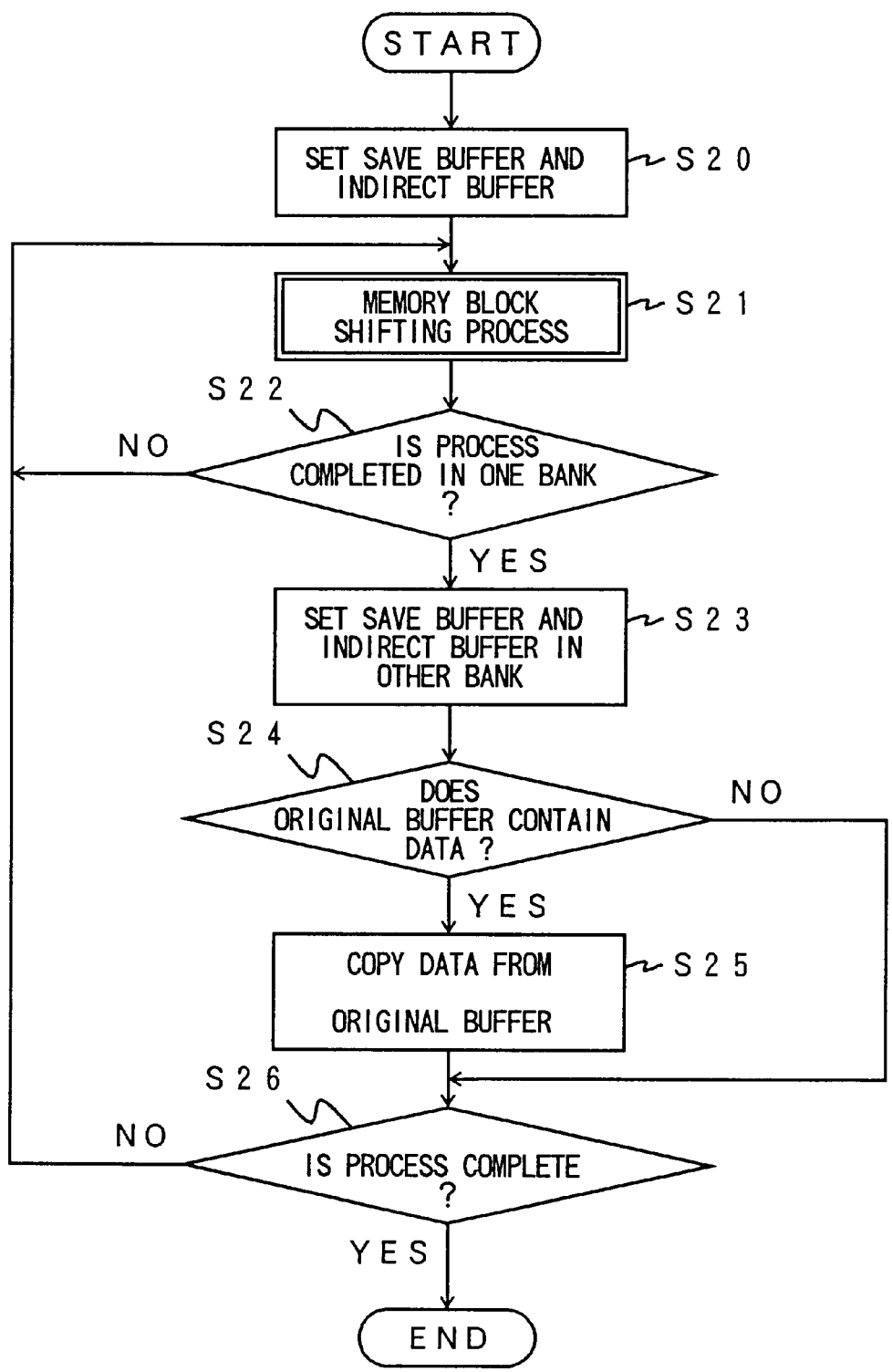
FIG. 11 is a flowchart illustrating a procedure of block shifting process.

FIG. 11 is a flowchart illustrating the procedure of block shifting process executed by the maintenance controller 33 (SA). The memory block shifting process is executed during the on-line service of the host computer 61.

In S20, the maintenance controller 33 (SA) sets the buffers BF1–BF4 in the stand-by memories 44 and 46 in the memory banks 0 and 1, respectively, the buffers BF1–BF4 being an area in which data is saved during the drive shifting operation.

The following information is saved in the buffers BF1–BF4.

presence or absence (Yes or No) of valid data in the buffer
starting address of valid data
quantity of valid data The maintenance controller 33 (SA) ensures that flags indicating the save buffer are stored in the memory banks 0 and 1 so that one of the buffers in a memory bank serves as a save buffer to which data is transferred from a target address in the memory 40 and the other buffer in a memory bank serves as an indirect input buffer temporarily used when data is transferred from an arbitrary address to the target address in the memory 40.

When unused, the buffer is regarded as having no valid data. The save buffer and the indirect input buffer that are first set belong to the memory bank that does not contain the starting address of the memory 40.

In S21, the maintenance controller 33 (SA) performs a shifting process in each block, as described later, starting from a memory block in which the memory starts with the starting address registered in the memory block table.

In S22, the maintenance controller 33 (SA) determines whether or not the process is completed in a memory bank. When the process is not complete, the shifting process of S21 is continued. When the process is complete for one of the memory banks, the save buffer and the indirect input buffer are set in the other memory bank in S23.

In S24, it is determined whether or not the buffer contains any valid data before the modification of S23 is carried out. When there is valid data in the initially set buffer, the data is copied from the initially set buffer to the new buffer in S25.

In S26, it is determined whether or not the process is complete for every memory block registered in the memory block table. When it is not, the operation flow returns to S21, and the shifting process is continued. When it is determined that the process is complete, the shifting process is terminated.

Figure 12:
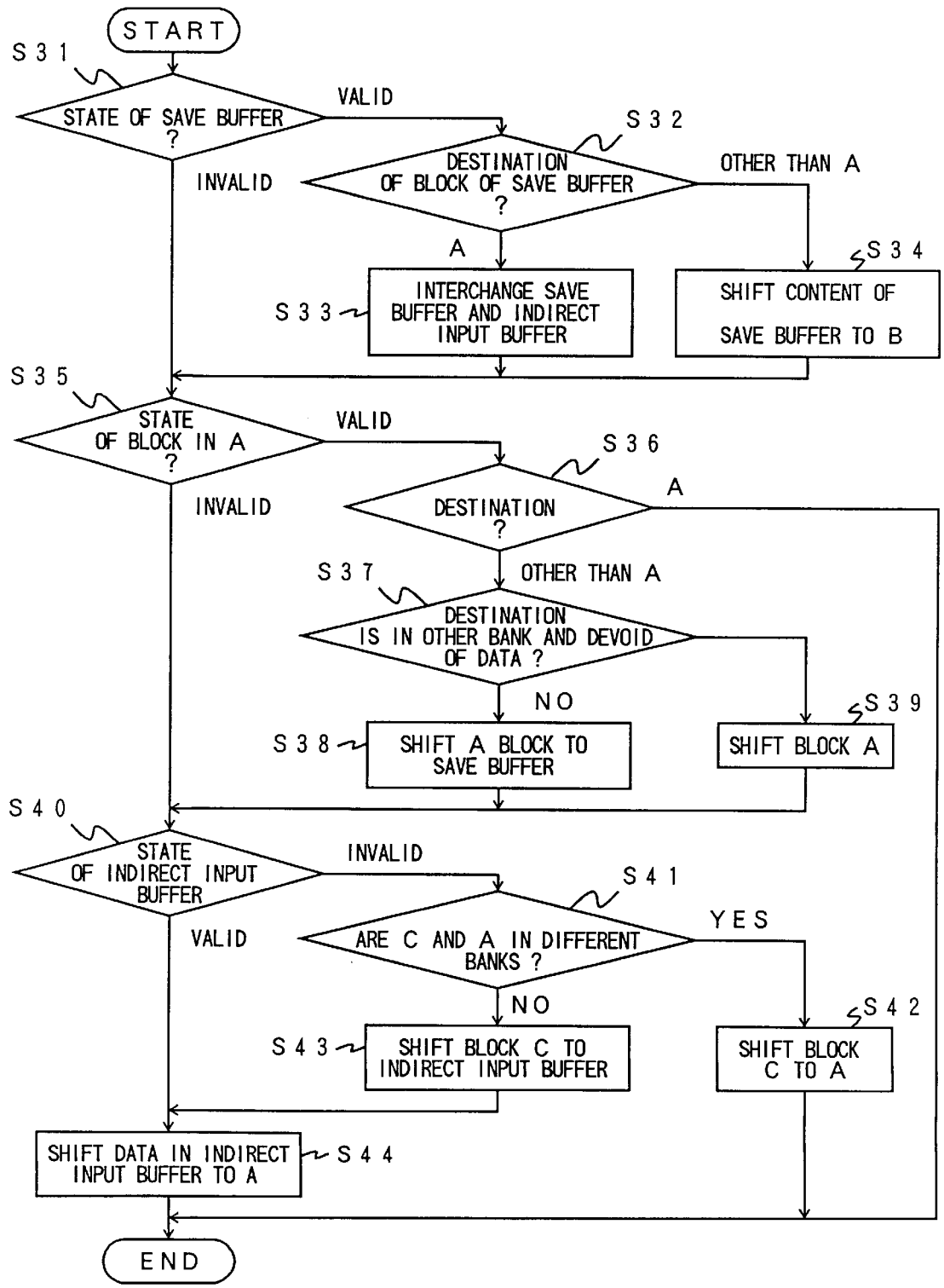
FIG. 12 is a flowchart illustrating a procedure of the memory block shifting process executed in one memory block.

FIG. 12 is a flowchart illustrating the procedure of the memory block shifting process for one memory block executed by the maintenance controller 33 (SA). The memory block processed is designated as A. The maintenance controller 33 (SA) executes the shifting process, starting from the starting memory block registered in the memory block table.

In S31, the state of the save buffer is checked. When there is valid data in the save buffer, the destination of the memory blocks in the save buffer is checked in S32.

When it is determined in S32 that the destination is the memory block A, the save buffer is emptied in S33. Further, the save buffer and the indirect input buffer are interchanged so that data is shifted from the indirect input buffer to the target memory block.

When it is determined in S32 that the destination of the memory block in the save buffer is other than the memory block A, the memory block table is referred to so as to determine an empty memory block with no valid data. The determined memory block is designated as the memory block B. The address of the memory block B is different from the address of the memory block A and from the addresses of the save buffer and the indirect input buffer. The data in the save buffer is shifted to the memory block B. When the data in the save buffer has not been shifted completely, the starting address of the valid data in the save buffer is modified to the starting address of the memory block, in the buffer, to which memory block data is shifted next. The shifting is carried out until the entire data is shifted.

When the memory block B and the save buffer are located in the same memory bank, the data in the save buffer is temporarily shifted to the buffer in the other memory bank and then shifted to the memory block B.

In S35, the state of the memory block A currently processed is checked. When there is valid data, the operation flow proceeds to S36. In S36, the destination of the data in the memory block A is checked. When the destination is the memory block A, no shifting process is necessary. Therefore, the process is terminated. When it is determined in S36 that the destination is other than the memory block A, the state of the destination is checked. When the destination memory block is located in the other memory bank to which the memory block A does not belong, and when the destination memory block contains invalid data and has a capacity larger than the memory block A, the data in the memory block A is shifted to the destination memory block in S39.

When it is determined in S37 that the destination memory block for the memory block A is located in the same memory bank as the memory block A, or that destination memory block belongs to the other memory bank to which the memory block A does not belong and contains valid data, or that the destination memory block belongs to the other memory bank and does not have capacity equal to or greater than the memory block A, the data in the memory block A is saved in the save buffer in S38.

When it is determined in S35 that there is no valid data in the memory block A, or when S38 or S39 is completed, the operation flow proceeds to S40. In S40, the state of the indirect input buffer is checked. When there is no valid data, the memory block table is referred to in S41 so as to determine a memory block whose destination is the memory block A. The determined memory block is designated as the memory block C. If the memory block C belongs to the other memory bank in which the memory block A is not located, the data in the memory block C is shifted to the memory block A in S42, whereupon the process is terminated.

In S42, when the memory block C is located in the same memory bank as the memory block A, the data in the memory block C is shifted to the indirect input buffer in S43.

When it is determined in S40 that there is valid data in the indirect input buffer, or when S43 is completed, the operation flow proceeds to S44, wherein the data in the indirect buffer is shifted to the target memory block A, whereupon the process is terminated.

While the data relating to the save buffer and the indirect input buffer is shifted during the shifting process, the maintenance controller 33 (SA) performs the following process.

When the data is shifted from arbitrary address to the save buffer or the indirect input buffer, the information relating to the presence or absence of the valid data in the destination buffer is made to indicate the presence of valid data. The valid data starting address of this buffer is designated as the starting address of the buffer, and the quantity of the valid data is designated to be the amount of data to be shifted.

When a part of data in the save buffer and the indirect input buffer is shifted to the other address starting from the head of the buffer, the starting address of the valid data in the buffer is designated to be the starting address of the memory block in the buffer that is not shifted. The valid data amount of the buffer is designated as the capacity of the memory block that is not shifted.

When the whole data in the save buffer and the indirect input buffer is shifted to the other address, the information relating to the presence or absence of the valid data in the buffer is made to indicate the absence of the valid data.

Figure 13:
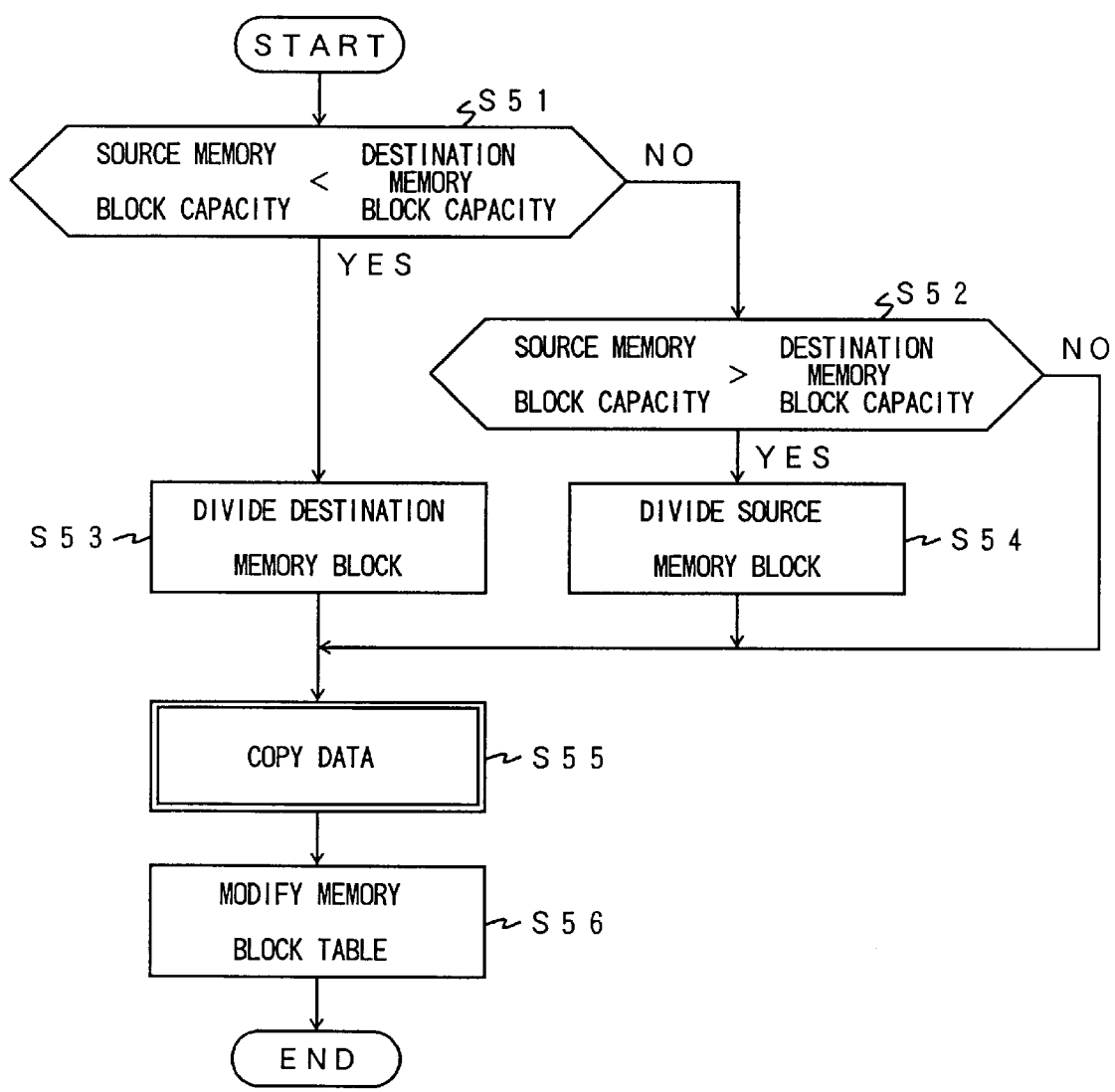
FIG. 13 is a flowchart illustrating a data shifting process procedure.

A description will now be given of the data shifting process during the memory block shifting process. FIG. 13 is a flowchart illustrating the data shifting process procedure executed during the memory block shifting process.

In S51 and S52, the capacity of the memory block specified as the source and the capacity of the destination memory block are compared. If the capacity of the source memory block is smaller than the capacity of the destination memory block, the memory block table is modified in S53 so that the destination memory block is divided into an area having the capacity of the source memory block and the remaining memory block.

When the capacity of the source memory block exceeds the capacity of the destination memory block, in S54, the memory block table is modified so that the source memory block is divided into an area having the capacity of the destination memory block and the memory block.

In S55, the data is copied from the source memory block to the destination memory block.

Thereafter, in S56, the memory block table is modified such that the data in the source memory block is designated as invalid data, and the data in the destination memory block is designated as valid data. The memory block whose data is designated as invalid data is integrated with a memory block whose address is contiguous with the former memory block and which does not have valid data. The latter memory block may precede or follow the former.

Figure 14:
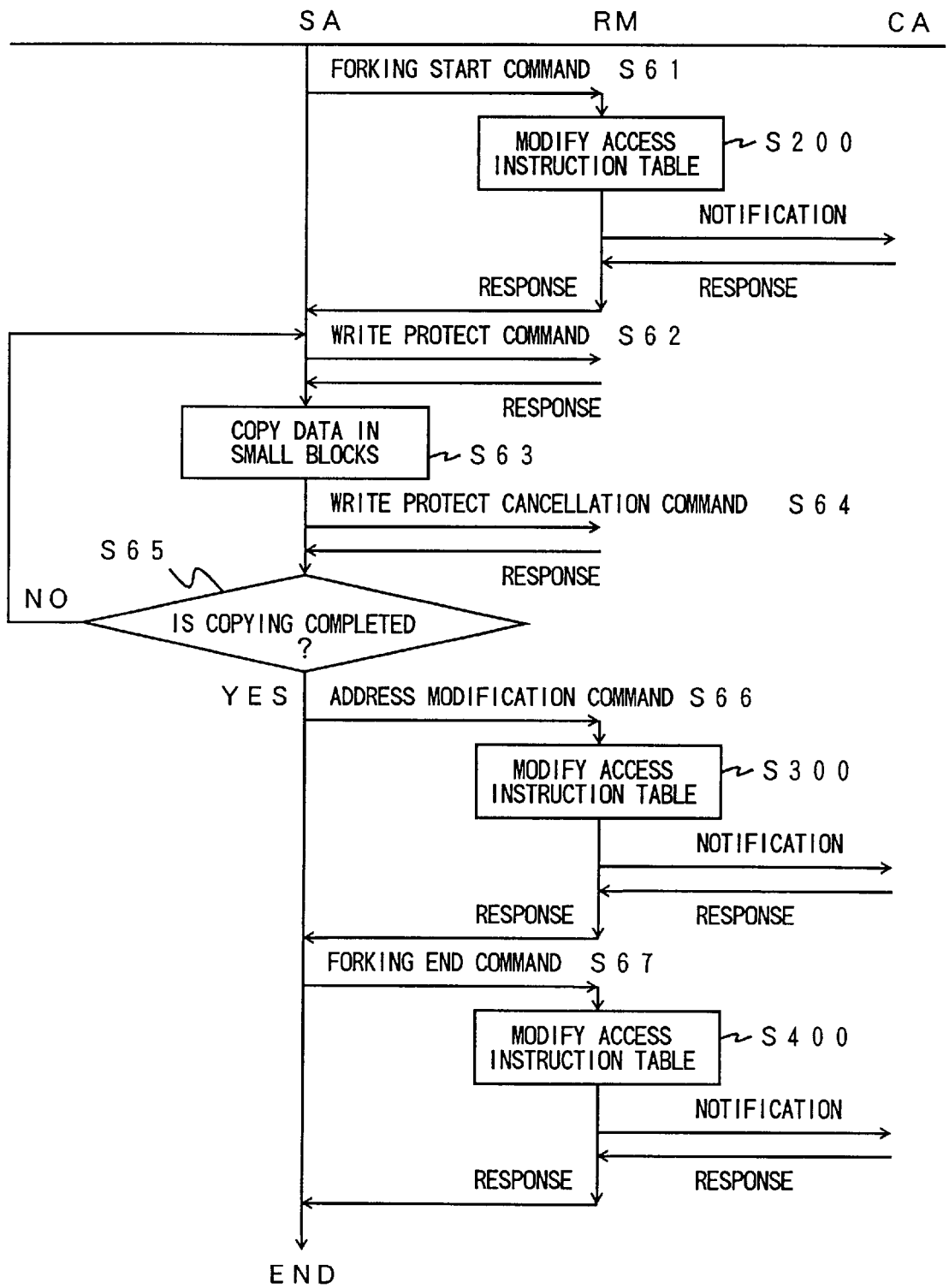
FIG. 14 is a flowchart illustrating a procedure of data copying process.

FIG. 14 is a flowchart illustrating the procedure of data copying process. In S61, the maintenance controller 33 (SA) issues a forking start command to the exclusive controller 32 (RM), the command instructing the interface controller 31 (CA) to perform forking write operation so that data is forking-written to the copying source memory block and the copying destination memory block. The parameter of the command are the starting address of the source and destination memory blocks used in the forking write operation, and the number of cylinders processed in the forking write operation.

Figure 15:
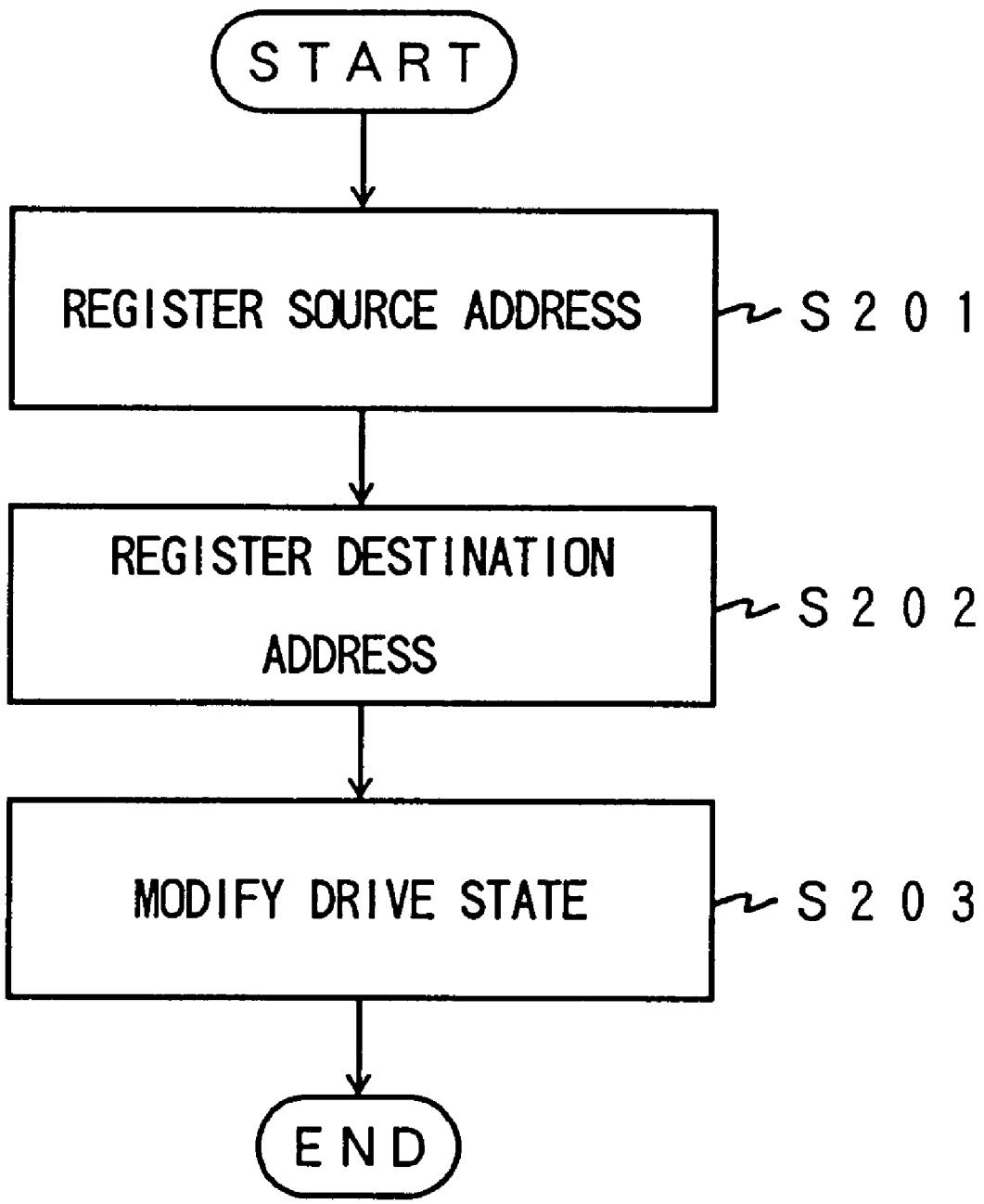
FIG. 15 is a flowchart illustrating a procedure of modifying the access instruction table executed in correspondence to a forking start command.

FIG. 15 is a flowchart illustrating the procedure of modifying the access instruction table executed in correspondence to the forking start command. In S201, upon receiving the forking start command, the exclusive controller 32 (RM) searches the access instruction table for a block including the starting address of the source specified by the parameter. The exclusive controller 32 (RM) registers the starting address of the source as the forking starting address (source address read) of the drive to which the block determined through the above searching belongs. In S202, the starting address of the source is registered as the forking starting address of the destination (destination address not read).

In S203, the information, of the drive to which the block determined through the searching belongs, relating to the specification of forking is made to indicate that the forking is to be carried out.

The exclusive controller 32 (RM) notifies all the interface controllers 31 (CA) that the access instruction table for the drive subjected to the forking write operation is rewritten. Upon receipt of the response from all the interface controllers 31 (CA), the exclusive controller 32 (RM) notifies the maintenance controller 33 (SA) of the termination.

Referring back to FIG. 14, in S62–65, the entire data in the source memory block is copied to the destination memory block. The target memory block is divided into small blocks each having 10 cylinders, and the copying is done in units of the small blocks. In S62, a write protect command for disabling the interface controller 31 (CA) to write data is issued to the exclusive controller 32 (RM).

In S63, data copying is carried out such that the data is read from the source small blocks, and the data is written to the destination small blocks.

In S64, a write protect cancellation command for canceling the write protect command issued in S62 is issued to the exclusive controller 32 (RM).

In S65, it is determined whether or not all the data within the memory block processed in the copying operation is copied. When it is determined that the not all the data is copied, the operation flow returns to S62, whereupon the data copying in small blocks is continued. When all the data has been copied, the operation flow proceeds to S66.

In S66, an address modification command is issued to the exclusive controller 32 (RM) so as to modify the access instruction table in correspondence to the starting address of the block in each drive which block is modified by the copying operation of S62–65, and in correspondence to the capacity of the modified block.

By modifying the access instruction table in correspondence to the memory block copying executed, the interface controller 31 (CA) is able to access the proper modified address.

Figure 16:
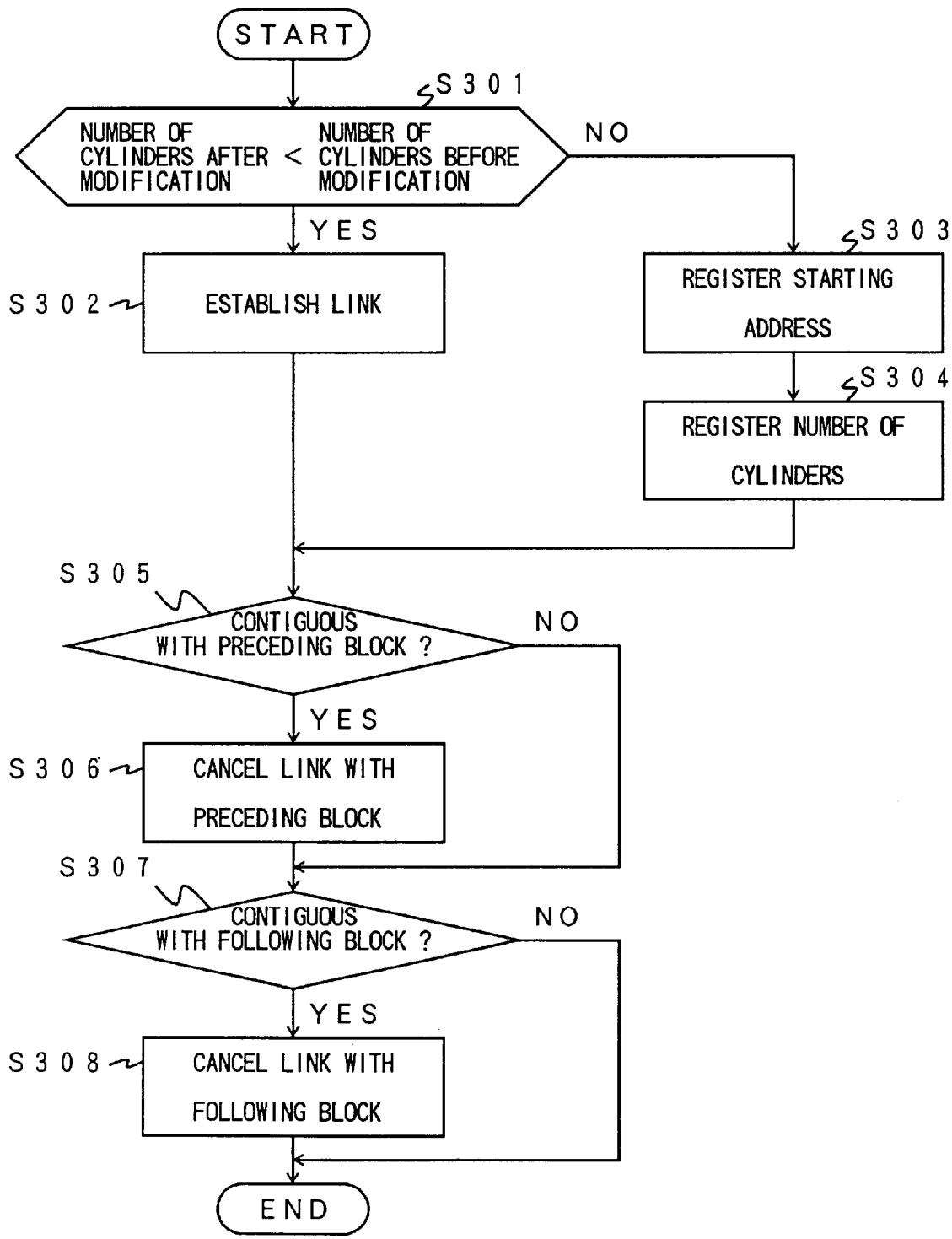
FIG. 16 is a flowchart illustrating a procedure of modifying the access instruction table executed in correspondence to an address modification command.

FIG. 16 is a flowchart illustrating the procedure of modifying the access instruction table and corresponding to the address modification command. The parameter of the address modification command are the starting address of the source memory block, the starting address of the destination memory block and the number of cylinders thereof.

The exclusive controller 32 (RM), upon receiving the address modification command, refers to the access instruction table in S301 so as to identify a source block starting with the source address specified by the parameter. The number of cylinders in the destination memory block whose address is modified is compared with the number of cylinders existing before the address modification. When the number of cylinders existing after the address modification does not reach the number of cylinders existing before the modification, a link is established such that the original block is divided into a block having the specified number of cylinders and the remaining block.

Specifically, a field of the block created anew by dividing the original block is inserted before the field of the original block, the insertion being done in the access instruction table. The starting address of the destination specified by the parameter is designated as the starting address of the new block, and the number of cylinders specified by the parameter is designated as the number of cylinders of the new block. Next, the starting address of the original block is made to recede from the starting address of the original block by the number of cylinders of the new block, and the number of cylinders of the original block is configured to be a difference obtained by subtracting the number of cylinders of the new block from the number of cylinders of the original block.

As a result of the link establishment process, the starting address of the new block is accessed instead of the starting address of the original block before the original block is modified.

When it is determined in S301 that the number of cylinders of the block specified by the address modification command coincides with the number of cylinders of the original block, the whole of the original block is shifted to the specified address. Therefore, in S303, the starting address of the original block is modified to be the specified address, in the access instruction table. In S304, the number of cylinders equal to the number of cylinders of the original block is registered as the number of cylinders after the modification.

When the modified block is not the starting block, it is determined in S305 whether or not the modified block has the address contiguous with the address of the preceding block, on the basis of the information in the access instruction table. When the addresses are contiguous with each other, the modified block is integrated with the preceding block in S306, whereupon the link is canceled. Specifically, the number of cylinders of the preceding block is added to the number of cylinders of the modified block, and the modified block is removed.

When the modified block is not a last block, it is determined in S307 whether or the address of the modified block is contiguous with the following block, on the basis of the information in the access instruction table. When the addresses are contiguous with each other, the modified block is integrated with the following block in S308, whereupon the link is canceled. Specifically, the number of cylinders of the modified block is added to the number of cylinders of the following block, and the following block is removed.

The exclusive controller 32 (RM) notifies all the interface controllers 31 (CA) that the access instruction table is rewritten for the drive whose address is modified. Upon receipt of the response from all the interface controllers 31 (CA), the exclusive controller 32 (RM) notifies the maintenance controller 33 (SA) of the termination.

Referring back to FIG. 14, when the copying of the one memory block is completed through S62–65, the maintenance controller 33 (SA) instructs the termination of the forking write operation to be carried out so that the write operation is conducted only on the copy destination memory block. For this purpose, the maintenance controller 33 (SA) issues a forking end command to the exclusive controller 32 (RM).

Figure 17:
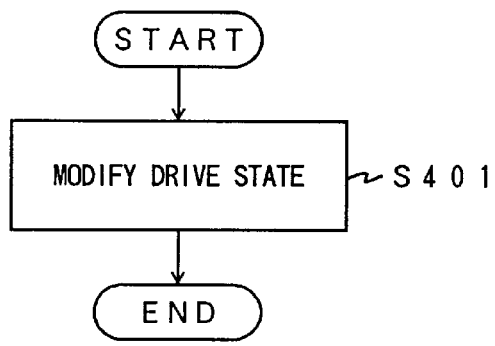
FIG. 17 is a flowchart illustrating a access instruction table modification process corresponding to a forking end command.

FIG. 17 is a flowchart illustrating the access instruction table modification process corresponding to the forking end command. Upon receipt of the forking end command from the maintenance controller 33 (SA), the exclusive controller 32 (RM) determines the identity of the drive specified to be an object of the forking operation, by referring to the access instruction table, and then cancel the forking specification. The exclusive controller 32 (RM) notifies all the interface controllers 31 (CA) that the access instruction table has been rewritten. After receiving the response from all the interface controllers 31 (CA), the exclusive controller 32 (RM) notifies the maintenance controller 33 (SA) that the process has been terminated. This completes the data copying process of FIG. 14.

As has been described, during the memory block shifting process accompanying the modification of the logical blocks, it is not necessary to prohibit access from the host computer 61. The host computer 61 is able to read from any address in the memory 40, and write to any address in the memory except for a write-protected area occurring as a result of the copying of small blocks.

Upon receipt of a read command from the host computer 61, the interface controllers 31 (CA) determines the memory address from which data is to be read, in the following manner. The address specified by the host computer 61 comprises a logical drive, a cylinder number (specified cylinder), a head number and a record number. The interface controller 31 (CA) determines a block including the specified cylinder of the specified drive, by referring to the access instruction table, and then obtains the starting address (cylinder address) of the block. An offset from the starting address to the specified cylinder is calculated and is added to the starting address of the block, the sum being then added to the value of the head number. In this way, the starting address (cylinder address) of the target track is obtained. The directory information part at the start of the target track contains an index of the records in the track. The memory address of the target record is obtained by reading the index.

Upon receipt of a write command from the host computer 61, the interface controller 31 (CA) determines the memory address to which data is to be written, in the following manner. The interface controller 31 (CA) obtains the address of the target record by referring to the access instruction table, similarly to the case of the read command. When the forking is specified for the specified drive, the interface controller 31 (CA) determines whether or not the determined address is located within a range for which a forking is specified. When it is, a difference between the starting address, that is, an address associated with a source in a reading operation in the forking range, and the write address obtained as described before. The difference is added to the starting address of a destination (that is, a forking operation area that is not read). In this way, the other address that is subject to the forking operation is obtained.

A description will now be given of an example of shifting data by memory block shifting process. FIGS. 18–27 are diagrams explaining data shifting by memory block shifting process.

Figure 18:
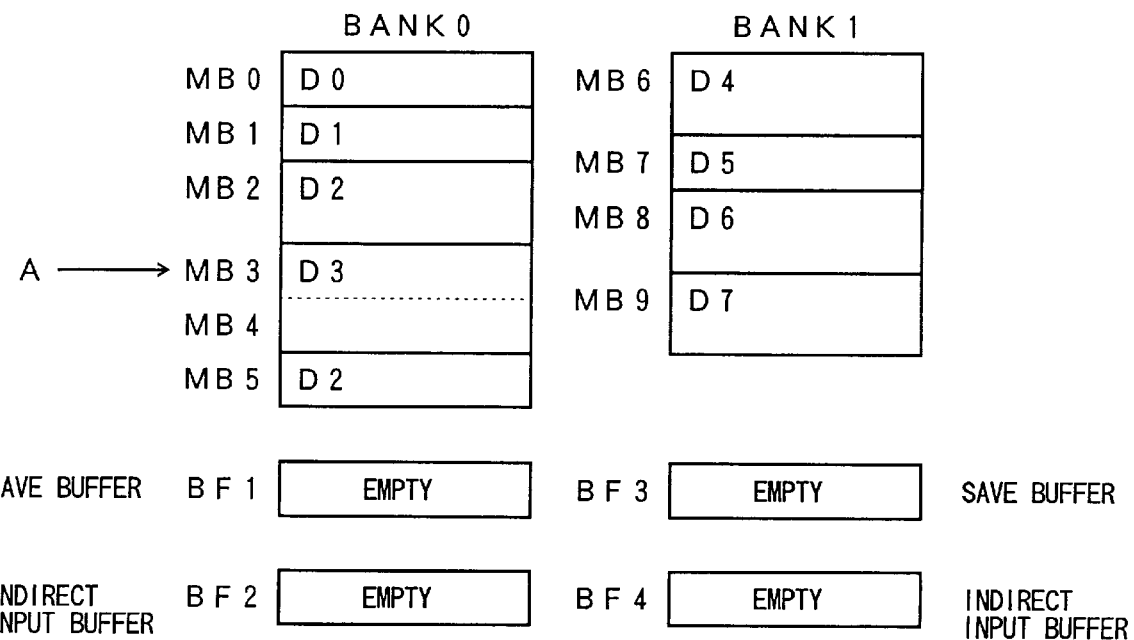
FIG. 18 is a diagram explaining data shifting by memory block shifting process.

As shown in FIG. 18, the memory bank 0 is allocated to drives 0 (D0)–3 (D3), and the memory bank 1 is allocated to drives 4 (D4)–7 (D7). A memory expansion is provided after the drive 3, and the expanded blocks of the drive 2 (D2) are linked with the memory expansion.

The blocks corresponding to the drives 0–2 are designated as memory blocks 0 (MB0)–2 (MB2), and the blocks corresponding to the drives 4–7 are designated as memory blocks 6 (MB6)–9 (MB9). The drive 3 is made to correspond to the memory blocks 3 (MB3) and 4 (MB4) that are subject to the shifting process.

The memory bank 0 is provided with the buffers BF1 and BF2, the memory bank 1 is provided with the buffers BF3 and BF4. In an initial state, the buffers BF1 and BF3 are set to be save buffers, and the buffer BF4 is set to be an indirect input buffer.

In this example, the data in the memory block 3 and the data in the memory block 4 are shifted to the memory block 4 and the memory block 5, respectively. The data in the memory block 5 is shifted to the memory block 3. As a result of this shifting process, the blocks of the expanded drive 2 are arranged in contiguous addresses.

In FIG. 18, the memory block A subject to the shifting process is the memory block 3. The memory block shifting process is executed in S21 of FIG. 11 (see FIG. 12 flowchart).

Figure 19:
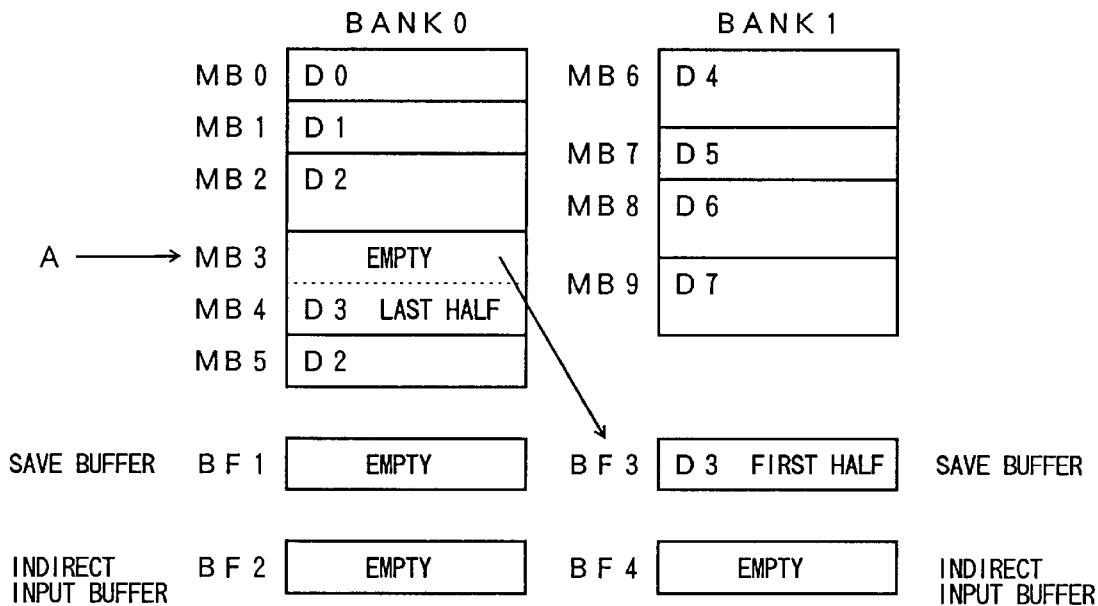
FIG. 19 is a diagram explaining data shifting by memory block shifting process.

The process is started in the state of FIG. 18. FIG. 19 illustrates an operation executed in S38 of FIG. 12, wherein the data in the processed memory block A (the data in the first half of the drive 3) is shifted to the save buffer BF3.

Figure 20:
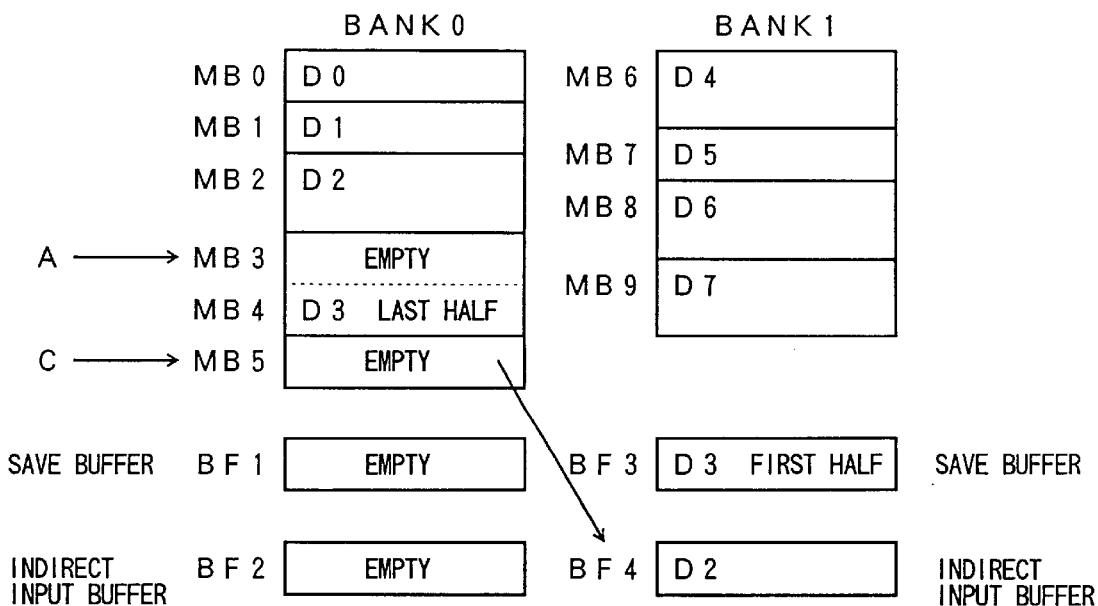
FIG. 20 is a diagram explaining data shifting by memory block shifting process.

FIG. 20 illustrates an operation executed in S43 of FIG. 12, wherein the memory block 5 data (the expansion of the drive 2) whose destination is the memory block A is shifted to the indirect input buffer BF4.

Figure 21:
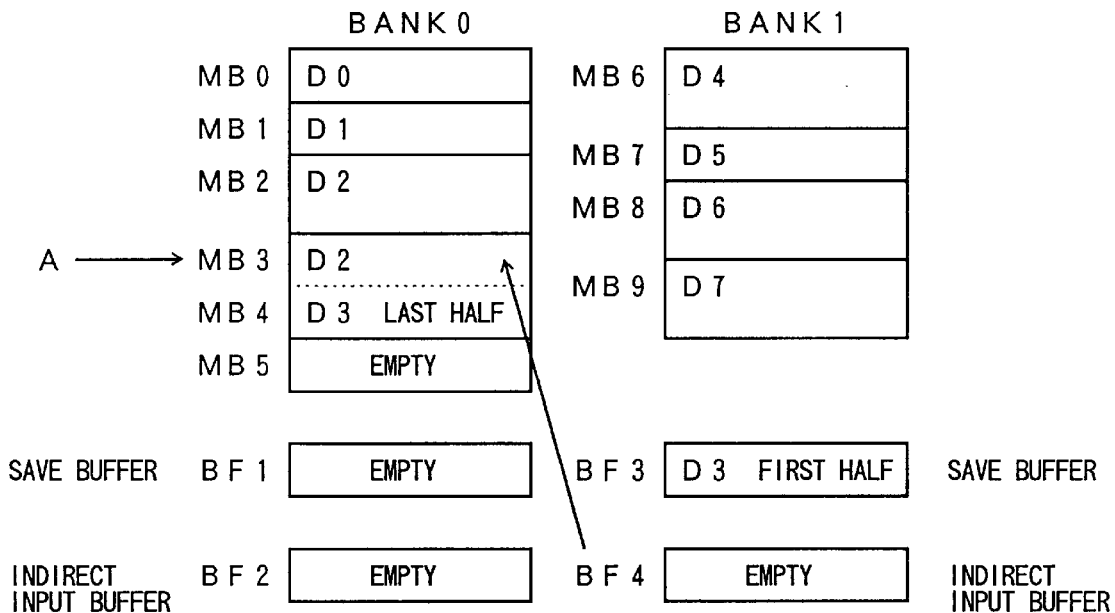
FIG. 21 is a diagram explaining data shifting by memory block shifting process.

FIG. 21 illustrates an operation executed in S44 of FIG. 12, wherein the indirect input buffer data (the expansion of the drive 2) is shifted to the destination memory block A (the memory block 3).

Figure 22:
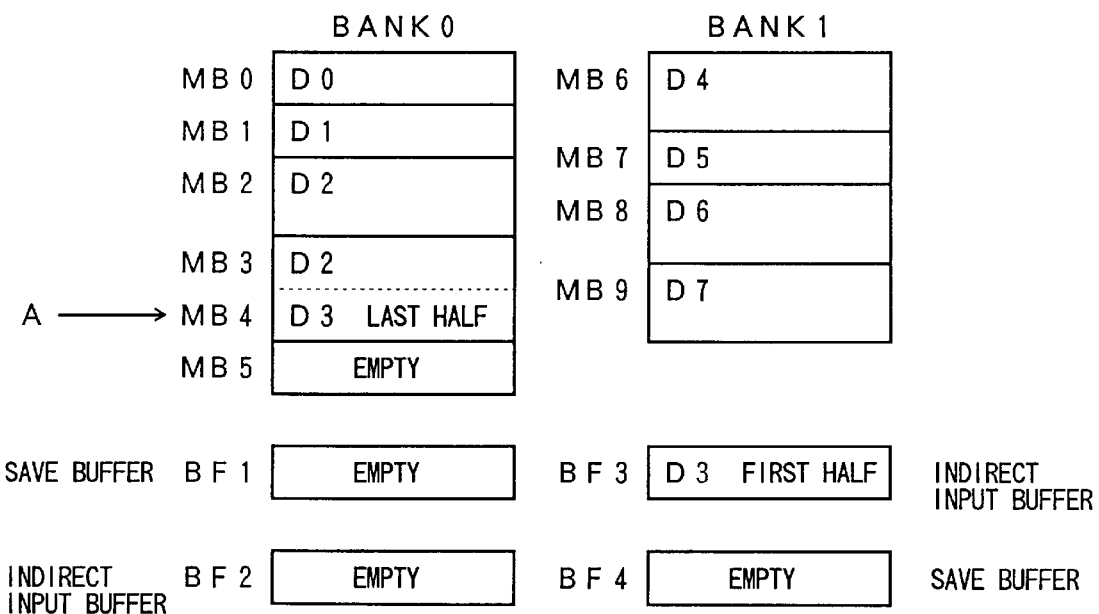
FIG. 22 is a diagram explaining data shifting by memory block shifting process.

This completes one round of the process according to the flowchart of FIG. 12. When a second round of the process is started thereafter, the memory block 4 becomes the processed memory block A. Since the destination of the memory block (the data in the first half of the drive 3) of the save buffer BF3 is the memory block A (the memory block 4), the save buffer and the indirect input buffer are interchanged in S33 of FIG. 12, as shown in FIG. 22. As a result, the buffer BF3 is the indirect input buffer, and the buffer BF4 is the save buffer.

Figure 23:
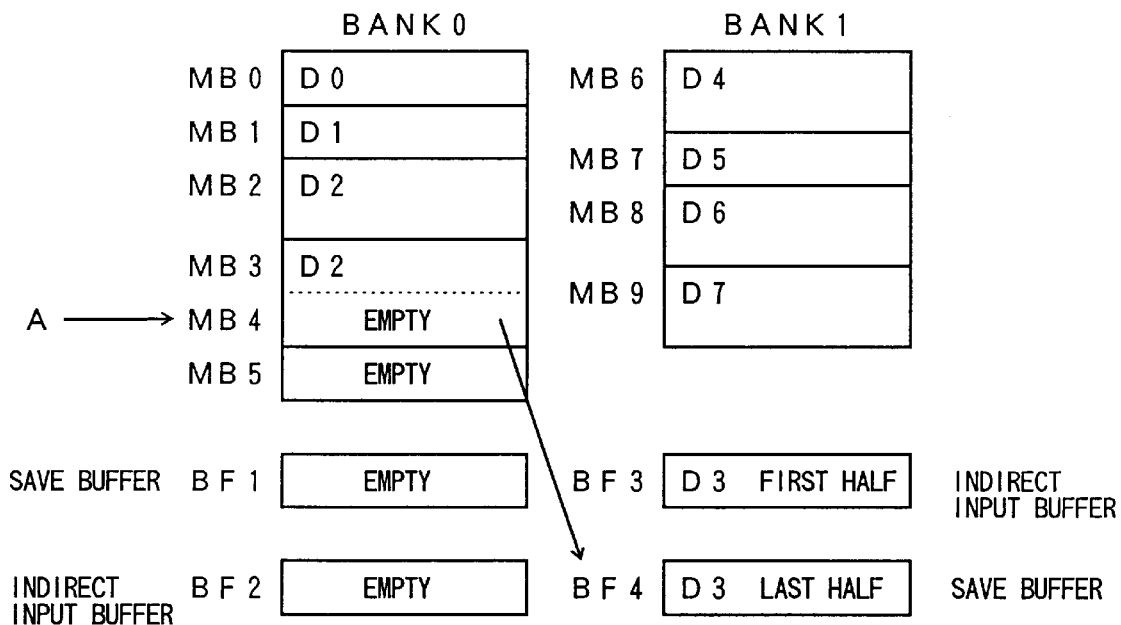
FIG. 23 is a diagram explaining data shifting by memory block shifting process.

FIG. 23 illustrates an operation executed in S38 of FIG. 12, wherein the data in the processed memory block A (the data in the last half of the drive 3) is shifted to the save buffer BF4.

Figure 24:
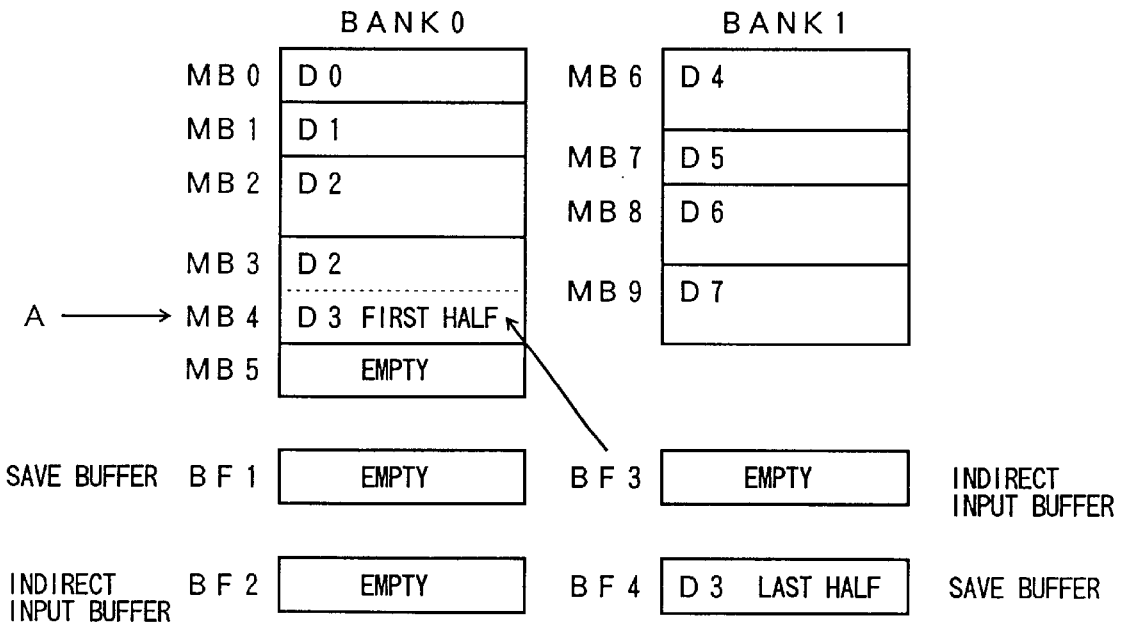
FIG. 24 is a diagram explaining data shifting by memory block shifting process.

FIG. 24 illustrates an operation executed in S44 of FIG. 12, wherein the data in the indirect input buffer (the data in the first half of the drive 3) is shifted to the destination memory block A (the memory block 4).

Figure 25:
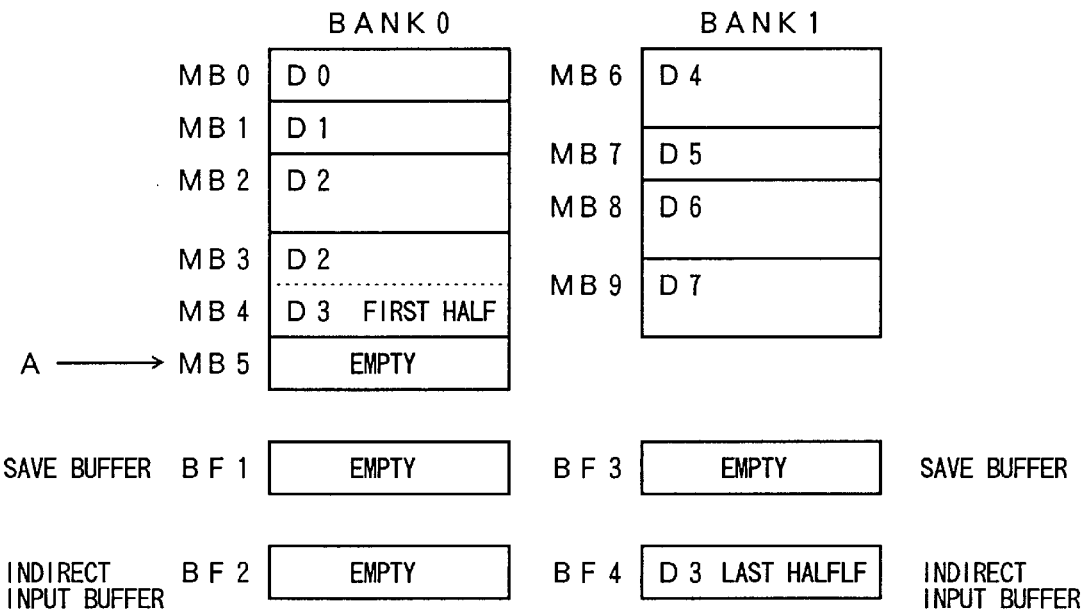
FIG. 25 is a diagram explaining data shifting by memory block shifting process.

This completes a second round of the process according to FIG. 12. When a third round of the process is started thereafter, the memory block 5 becomes the memory block A subject to the process. The destination of the memory block (the data in the last half of the drive 3) of the save buffer BF4 is the memory block A (the memory block 5). Therefore, the save buffer and the indirect input buffer are interchanged in S33 of FIG. 12, as shown in FIG. 25. As a result, the buffer BF4 is the indirect input, and the buffer BF3 is the save buffer.

Figure 26:
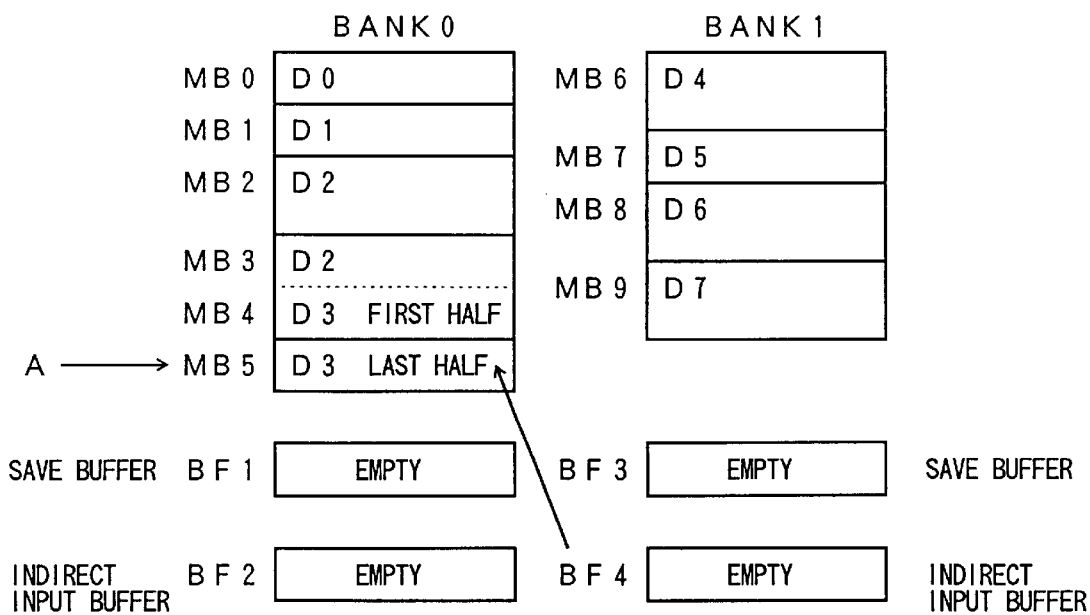
FIG. 26 is a diagram explaining data shifting by memory block shifting process.

FIG. 26 illustrates S44 of FIG. 12, wherein the data in the indirect input buffer BF4 (the data in the last half of the drive 3) is shifted to the destination memory block A (the memory block 5).

Figure 27:
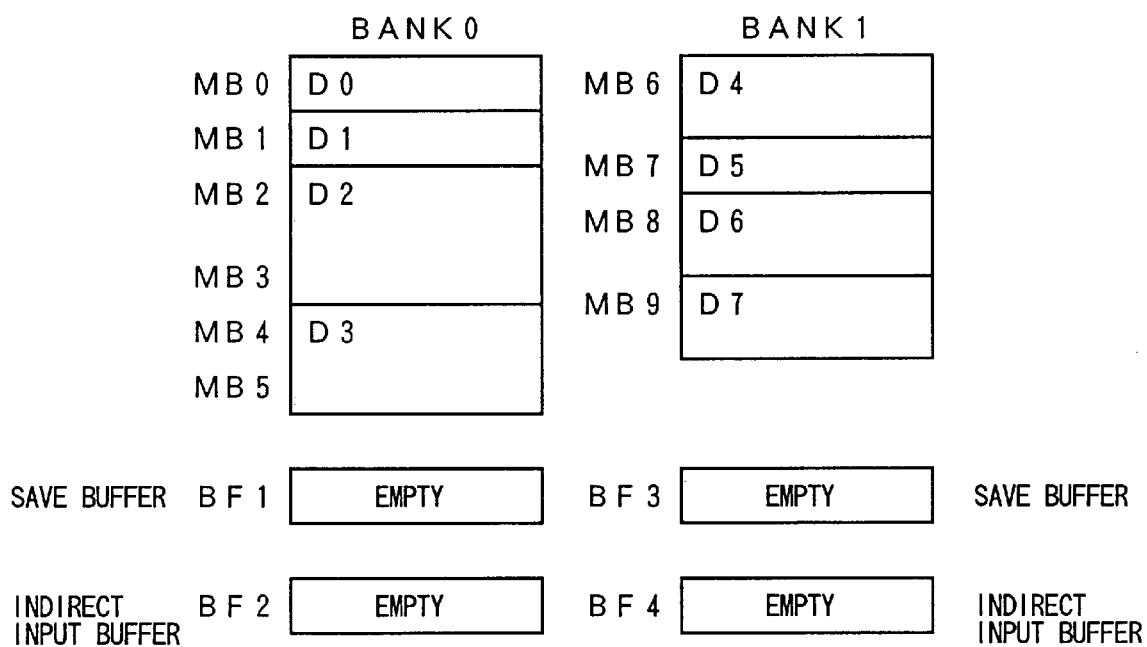
FIG. 27 is a diagram explaining data shifting by memory block shifting process.

This completes the memory block shifting process. FIG. 27 illustrates the state existing after 5 the memory block shifting process. As shown in FIG. 27, the blocks in the drive 2 are integrates into one contiguous block.

The present invention is not limited to the above described embodiments, and variations and modifications may be made without departing from the scope of the present invention.

What is claimed is:

1. A memory device adapted to be connected to a plurality of host units, comprising:

at least two semiconductor memories each divided into a plurality of logical volumes;

access means for allowing the plurality of host units connected to said memory device to perform read/write accesses to said logical volumes;

data shifting means which performs data shifting required when the constitution of the logical volume is modified, the data shifting being done by using data buffers provided in a stand-by memory of said memory device, in units of memory blocks within the logical volume which is subject to modification; and access control means for allowing accesses from the host units to be performed properly while data is being shifted, wherein each of said semiconductor memories are divided into a plurality of groups, and wherein said access control means has a function of writing the same data to more than one of said plurality of groups at the same time.

2. The memory device as claimed in claim 1, wherein said data shifting means instructs said access control means so as to write data in a source memory block and in a destination memory block at the same time, when data is started to be shifted in a process of modifying the constitution of logical volume.

3. The memory device as claimed in claim 1, wherein said data shifting means creates, when data shifting process is started, a memory block table in a work memory, the memory block table including the information relating to a starting address of each memory block, a capacity of each memory block, presence or absence of valid data in each memory block, and a starting address of a destination, and wherein said data shifting means refers to/modifies said memory block table during the data shifting process.

4. The memory device as claimed in claim 1, wherein said data shifting means creates, when data shifting process is started, a memory block table in a work memory, the memory block table including the information relating to a starting address of each memory block, a capacity of each memory block, presence or absence of valid data in each memory block, and a starting address of a destination, and wherein said data shifting means refers to/modifies said memory block table during the data shifting process.

5. The memory device as claimed in claim 1, wherein said access control means creates/updates an access instruction table for enabling said host units access to target addresses on the basis of information from said data shifting means;

said access instruction table including information relating to whether or not a logical volume is valid, and a total capacity of a logical volume;

said access instruction table further including, in case a plurality of blocks are linked within a logical volume, a starting address of each block and a capacity of each block.

6. The memory device as claimed in claim 1, wherein said access control means creates/updates an access instruction table for enabling said host units to access target addresses on the basis of information from said data shifting means;

said access instruction table including information relating to whether or not a logical volume is valid, and a total capacity of a logical volume;

said access instruction table further including, in case a plurality of blocks are linked within a logical volume, a starting address of each block and a capacity of each block.

7. The memory device as claimed in claim 3, wherein said access control means creates/updates an access instruction table for enabling said host units to access target addresses on the basis of information from said data shifting means;

said access instruction table including information relating to whether or not a logical volume is valid, and a total capacity of a logical volume;

said access instruction table further including, in case a plurality of blocks are linked within a logical volume, a starting address of each block and a capacity of each block.

8. The memory device as claimed in claim 4, wherein said access control means creates/updates an access instruction table for enabling said host units to access target addresses on the basis of information from said data shifting means;

said access instruction table including information relating to whether or not a logical volume is valid, and a total capacity of a logical volume;

said access instruction table further including, in case a plurality of blocks are linked within a logical volume, a starting address of each block and a capacity of each block.

9. The memory device as claimed in claim 5, wherein said access instruction table further includes: information relating to whether or not it is necessary to write the same data in two areas at the same time in the logical volume; and information indicating a starting address and a capacity used when the same data is to be written in two areas at the same time.

10. The memory device as claimed in claim 6, wherein said access instruction table further includes: information relating to whether or not it is necessary to write the same data in two areas at the same time in the logical volume; and information indicating a starting address and a capacity used when the same data is to be written in two areas at the same time.

11. The memory device as claimed in claim 7, wherein said access instruction table further includes: information relating to whether or not it is necessary to write the same data in two areas at the same time in the logical volume; and information indicating a starting address and a capacity used when the same data is to be written in two areas at the same time.

12. The memory device as claimed in claim 8, wherein said access instruction table further includes: information relating to whether or not it is necessary to write the same data in two areas at the same time in the logical volume; and information indicating a starting address and a capacity used when the same data is to be written in two areas at the same time.

13. The memory device as claimed in claim 1, wherein said data shifting means comprises data shifting buffers including a save buffer for saving data from addresses subject to data shifting process, and an indirect input buffer for temporarily storing data when data is shifted from an arbitrary address to the address subject to the data shifting process.

14. The memory device as claimed in claim 13, wherein said data shifting means is able to set said save buffer and indirect input buffer for each memory group, and interchange said save buffer and indirect input buffer.

15. The memory device as claimed in claim 3, wherein said data shifting means creates said memory block table in correspondence to an expansion of memory blocks, and notifies said access control means that it is possible to use said expanded memory blocks as blocks within a logical volume, and also notifies said access control means of a logical volume number in which the memory block expansion takes place, a starting address of the memory block, and a capacity of the memory block.

16. The memory device as claimed in claim 4, wherein said data shifting means creates said memory block table in correspondence to an expansion of memory blocks, and notifies said access control means that it is possible to use said expanded memory blocks as blocks within a logical volume, and also notifies said access control means of a logical volume number in which the memory block expansion takes place, a starting address of the memory block, and a capacity of the memory block.

17. The memory device as claimed in claim 5, wherein said data shifting means creates said memory block table in correspondence to an expansion of memory blocks, and notifies said access control means that it is possible to use said expanded memory blocks as blocks within a logical volume, and also notifies said access control means of a logical volume number in which the memory block expansion takes place, a starting address of the memory block, and a capacity of the memory block.

18. The memory storage device as claimed in claim 6, wherein said data shifting means creates said memory block table in correspondence to an expansion of memory blocks, and notifies said access control means that it is possible to use said expanded memory blocks as blocks within a logical volume, and also notifies said access control means of a logical volume number in which the memory block expansion takes place, a starting address of the memory block, and a capacity of the memory block.

19. The memory device as claimed in claim 7, wherein said data shifting means creates said memory block table in correspondence to an expansion of memory blocks, and notifies said access control means that it is possible to use said expanded memory blocks as blocks within a logical volume, and also notifies said access control means of a logical volume number in which the memory block expansion takes place, a starting address of the memory block, and a capacity of the memory block.

20. The memory device as claimed in claim 8, wherein said data shifting means creates said memory block table in correspondence to an expansion of memory blocks, and notifies said access control means that it is possible to use said expanded memory blocks as blocks within a logical volume, and also notifies said access control means of a logical volume number in which the memory block expansion takes place, a starting address of the memory block, and a capacity of the memory block.

21. The memory device as claimed in claim 15, wherein said access control means registers a logical volume that said access control means is notified of, when the logical volume is not registered, the registration being done on the basis of a notification relating to the memory block expansion submitted by said data shifting means, and wherein said access control means modifies said access instruction table when the logical volume that said access control means is notified of is registered, so that the expanded memory block can be used by being linked with the existing memory blocks within the registered logical volume.

22. The memory device as claimed in claim 16, wherein said access control means registers a logical volume that said access control means is notified of, when the logical volume is not registered, the registration being done on the basis of a notification relating to the memory block expansion submitted by said data shifting means, and wherein said access control means modifies said access instruction table when the logical volume that said access control means is notified of is registered, so that the expanded memory block can be used by being linked with the existing memory blocks within the registered logical volume.

23. The memory device as claimed in claim 17, wherein said access control means registers a logical volume that said access control means is notified of, when the logical volume is not registered, the registration being done on the basis of a notification relating to the memory block expansion submitted by said data shifting means, and wherein said access control means modifies said access instruction table when the logical volume that said access control means is notified of is registered, so that the expanded memory block can be used by being linked with the existing memory blocks within the registered logical volume.

24. The memory device as claimed in claim 18, wherein said access control means registers a logical volume that said access control means is notified of, when the logical volume is not registered, the registration being done on the basis of a notification relating to the memory block expansion submitted by said data shifting means, and wherein said access control means modifies said access instruction table when the logical volume that said access control means is notified of is registered, so that the expanded memory block can be used by being linked with the existing memory blocks within the registered logical volume.

25. The memory device as claimed in claim 19, wherein said access control means registers a logical volume that said access control means is notified of, when the logical volume is not registered, the registration being done on the basis of a notification relating to the memory block expansion submitted by said data shifting means, and wherein said access control means modifies said access instruction table when the logical volume that said access control means is notified of is registered, so that the expanded memory block can be used by being linked with the existing memory blocks within the registered logical volume.

26. The memory device as claimed in claim 20, wherein said access control means registers a logical volume that said access control means is notified of, when the logical volume is not registered, the registration being done on the basis of a notification relating to the memory block expansion submitted by said data shifting means, and wherein said access control means modifies said access instruction table when the logical volume that said access control means is notified of is registered, so that the expanded memory block can be used by being linked with the existing memory blocks within the registered logical volume.

27. The memory device as claimed in claim 2, wherein said access control means modifies, on the basis of an instruction from said data shifting means to write data in the source memory block and in the destination memory block at the same time, said access instruction table so that the host units access the source memory block and the destination memory block specified by said instruction.

28. The device as claimed in claim 9, wherein said data shifting means instructs said access control means so as to write data in a source memory block and in a destination memory block at the same time, when data is started to be shifted in a process of modifying the constitution of the logical volume.

29. The memory device as claimed in claim 10, wherein said data shifting means instructs said access control means so as to write data in a source memory block and in a destination memory block at the same time, when data is started to be shifted in a process of modifying the constitution of the logical volume.

30. The device as claimed in claim 11, wherein said data shifting means instructs said access control means so as to write data in a source memory block and in a destination memory block at the same time, when data is started to be shifted in a process of modifying the constitution of the logical volume.

31. The device as claimed in claim 12, wherein said data shifting means instructs said access control means so as to write data in a source memory block and in a destination memory block at the same time, when data is started to be shifted in a process of modifying the constitution of the logical volume.

32. The memory device as claimed in claim 28, wherein said access control means modifies, on the basis of an instruction from said data shifting means to write data in the source memory block and in the destination memory block at the same time, said access instruction table so that the host units access the source memory block and the destination memory block specified by said instruction.

33. The memory device as claimed in claim 29, wherein said access control means modifies, on the basis of an instruction from said data shifting means to write data in the source memory block and in the destination memory block at the same time, said access instruction table so that the host units access the source memory block and the destination memory block specified by said instruction.

34. The memory device as claimed in claim 30, wherein said access control means modifies, on the basis of an instruction from said data shifting means to write data in the source memory block and in the destination memory block at the same time, said access instruction table so that the host units access the source memory block and the destination memory block specified by said instruction.

35. The memory device as claimed in claim 31, wherein said access control means modifies, on the basis of an instruction from said data shifting means to write data in the source memory block and in the destination memory block at the same time, said access instruction table so that the host units access the source memory block and the destination memory block specified by said instruction.

36. The memory device as claimed in claim 5, wherein said data shifting means supplies, in correspondence to a modification of the constitution of the logical volume, an address modification instruction for modifying an address that is accessed, after the data shifting process accompanying the modification of the constitution of the logical volume.

37. The device as claimed in claim 6, wherein said data shifting means supplies, in correspondence to a modification of the constitution of the logical volume, an address modification instruction for modifying an address that is accessed, after the data shifting process accompanying the modification of the constitution of the logical volume.

38. The memory device as claimed in claim 7, wherein said data shifting means supplies, in correspondence to a modification of the constitution of the logical volume, an address modification instruction for modifying an address that is accessed, after the data shifting process accompanying the modification of the constitution of the logical volume.

39. The memory device as claimed in claim 8, wherein said data shifting means supplies, in correspondence to a modification of the constitution of the logical volume, an address modification instruction for modifying an address that is accessed, after the data shifting process accompanying the modification of the constitution of the logical volume.

40. The memory device as claimed in claim 36, wherein said access control means modifies a block starting address of said access instruction table on the basis of said address modification instruction from said data shifting means.

41. The memory device as claimed in claim 37, wherein said access control means modifies a block starting address of said access instruction table on the basis of said address modification instruction from said data shifting means.

42. The memory device as claimed in claim 38, wherein said access control means modifies a block starting address of said access instruction table on the basis of said address modification instruction from said data shifting means.

43. The memory device as claimed in claim 39, wherein said access control means modifies a block starting address of said access instruction table on the basis of said address modification instruction from said data shifting means.

* * * * *